(12) United States Patent
Zusy

(10) Patent No.: US 9,598,131 B2
(45) Date of Patent: Mar. 21, 2017

(54) ARTICULATED TWO-WHEELED VEHICLES

(71) Applicant: Matthew Zusy, North Royalton, OH (US)

(72) Inventor: Matthew Zusy, North Royalton, OH (US)

( * ) Notice: Subject to any disclaimer, the term of this patent is extended or adjusted under 35 U.S.C. 154(b) by 0 days.

(21) Appl. No.: 14/650,835

(22) PCT Filed: Dec. 18, 2013

(86) PCT No.: PCT/US2013/076106
§ 371 (c)(1),
(2) Date: Jun. 9, 2015

(87) PCT Pub. No.: WO2014/100167
PCT Pub. Date: Jun. 26, 2014

(65) Prior Publication Data
US 2015/0314826 A1    Nov. 5, 2015

Related U.S. Application Data

(60) Provisional application No. 61/738,626, filed on Dec. 18, 2012.

(51) Int. Cl.
*B62K 3/02* (2006.01)
*B62K 15/00* (2006.01)
*B62K 21/00* (2006.01)

(52) U.S. Cl.
CPC .............. *B62K 3/02* (2013.01); *B62K 15/006* (2013.01); *B62K 21/00* (2013.01)

(58) Field of Classification Search
CPC .................................. B62M 1/00; B62K 21/00
See application file for complete search history.

(56) References Cited

U.S. PATENT DOCUMENTS

| | | | | |
|---|---|---|---|---|
| 86,235 | A * | 1/1869 | Laubach | B62K 9/02 280/263 |
| 3,785,086 | A * | 1/1974 | Escobedo | A63H 17/36 446/440 |
| 4,219,209 | A * | 8/1980 | Haack | B62K 3/02 280/278 |
| 5,496,052 | A | 3/1996 | Tamaishi | |
| 5,593,168 | A | 1/1997 | Chou | |
| 6,270,103 | B1 * | 8/2001 | Grimm | B62K 25/005 280/270 |
| 6,450,519 | B1 * | 9/2002 | Wang | B62K 21/00 280/266 |
| 6,719,081 | B2 * | 4/2004 | Liao | B62K 21/00 180/219 |

(Continued)

FOREIGN PATENT DOCUMENTS

KR    WO 2012081924 A2 *    6/2012    ............... B62K 3/10

OTHER PUBLICATIONS

International Search Report dated Apr. 30, 2014 for International Application No. PCT/US2013/076106, 1 page.

*Primary Examiner* — Kevin Hurley
(74) *Attorney, Agent, or Firm* — Amin, Turocy & Watson, LLP

(57) ABSTRACT

Articulated two-wheeled vehicles have front and rear frame sub-assemblies connected together by an articulated frame joint configured to enable directional and angled counter-action of front and rear wheels or skis.

19 Claims, 24 Drawing Sheets

(56) References Cited

U.S. PATENT DOCUMENTS

| | | | | |
|---|---|---|---|---|
| 7,927,258 B2* | 4/2011 | Irving | ............... | A63B 21/015 |
| | | | | 482/51 |
| 8,342,546 B2* | 1/2013 | Bryant | ............... | B62K 21/08 |
| | | | | 280/272 |
| 8,550,482 B2* | 10/2013 | Park | ............ | B60T 7/102 |
| | | | | 280/272 |
| 9,039,027 B2* | 5/2015 | Marais | ............ | B62K 3/02 |
| | | | | 280/287 |
| 2013/0270792 A1* | 10/2013 | Park | ............ | B62K 3/10 |
| | | | | 280/278 |
| 2015/0238797 A1* | 8/2015 | Irving | ............ | A63B 23/0476 |
| | | | | 482/57 |

* cited by examiner

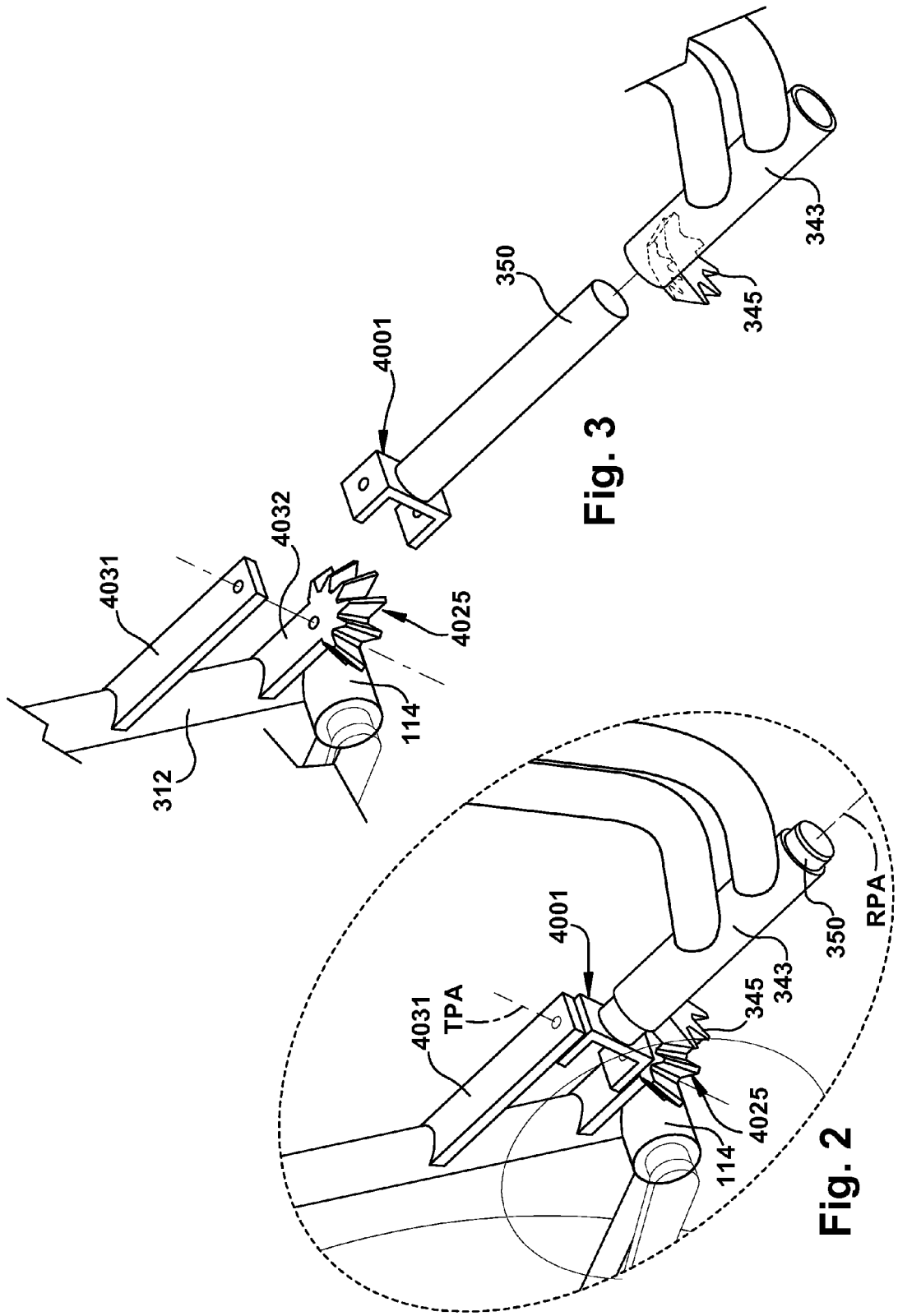

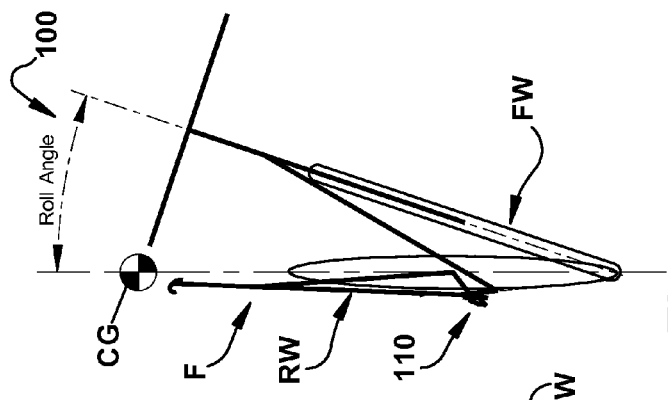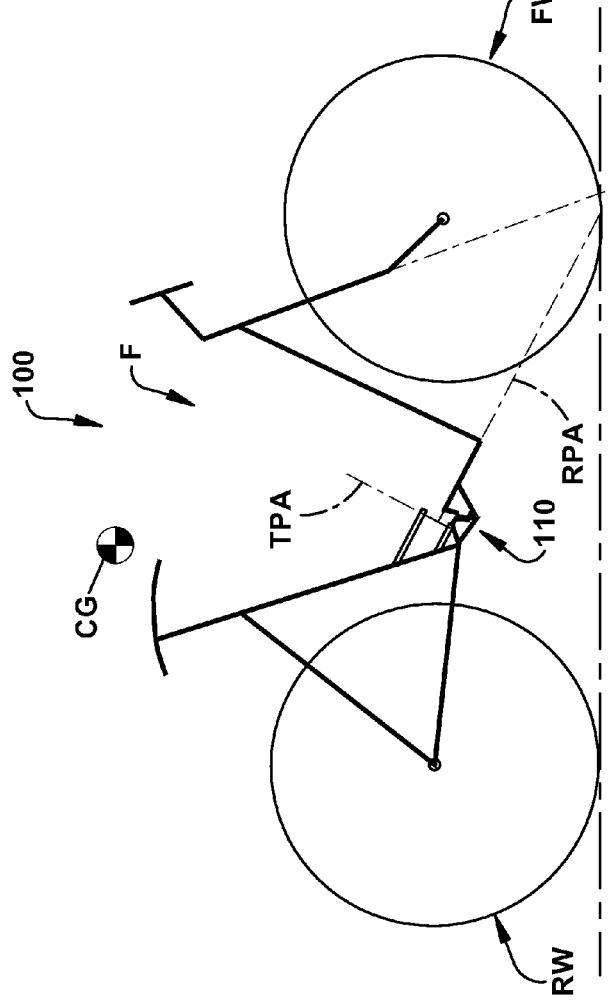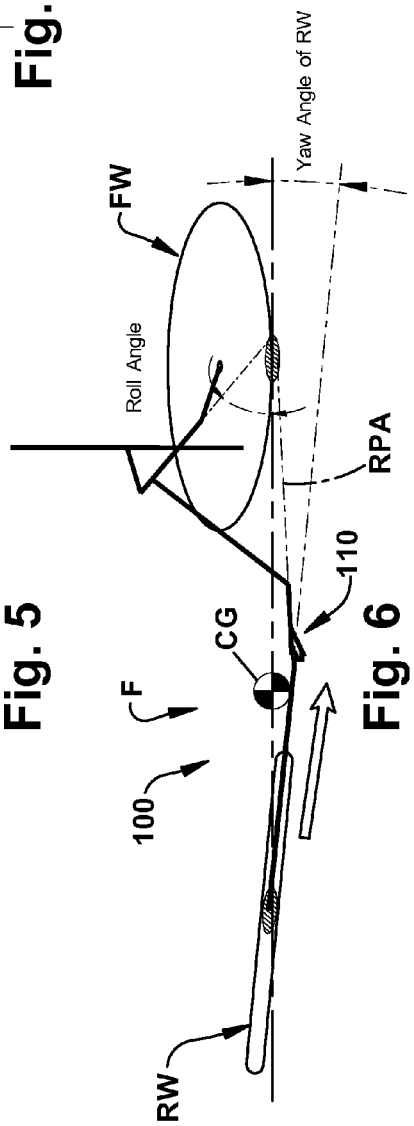

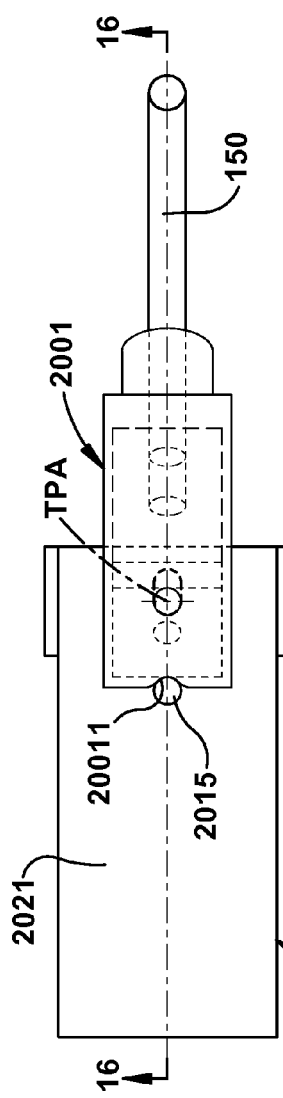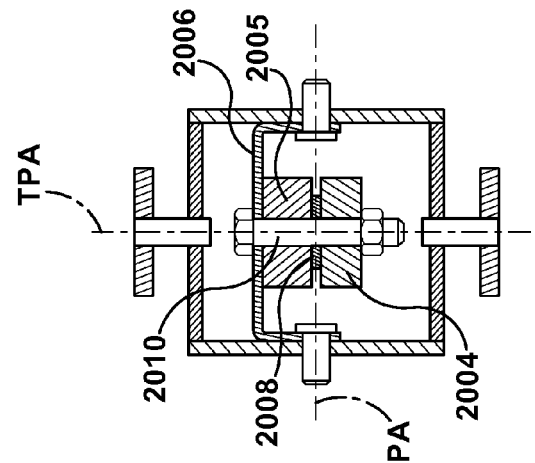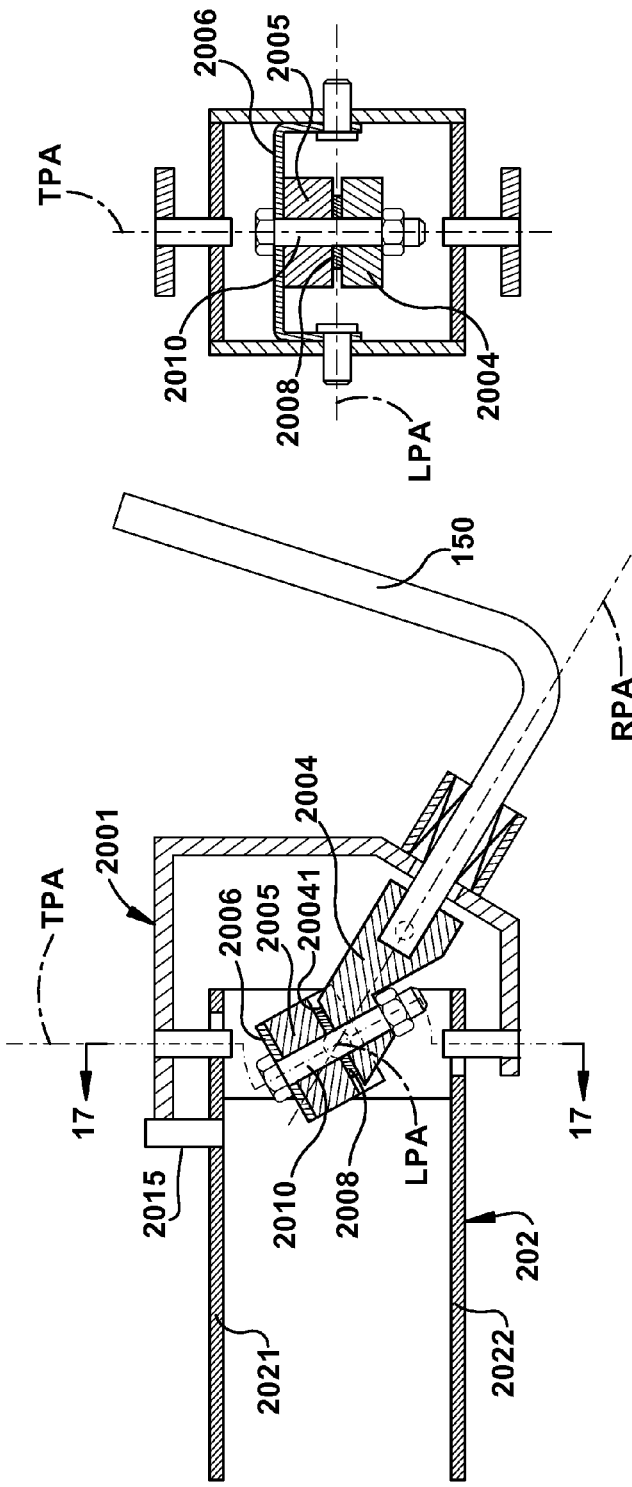

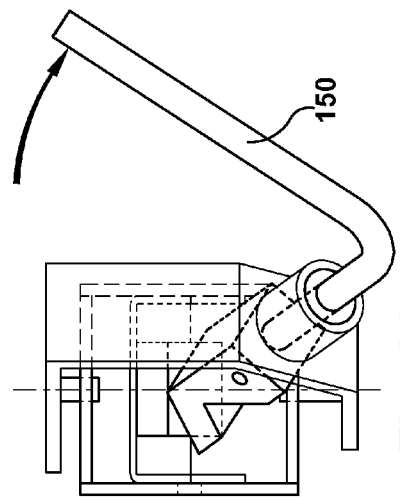
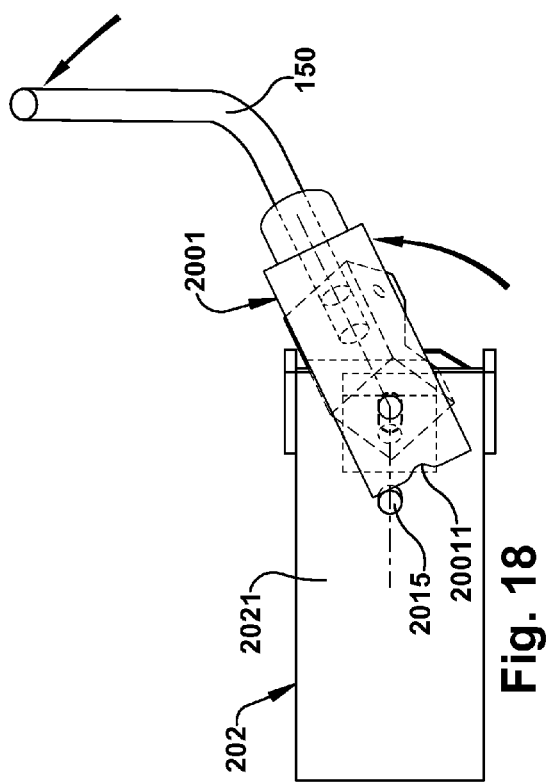
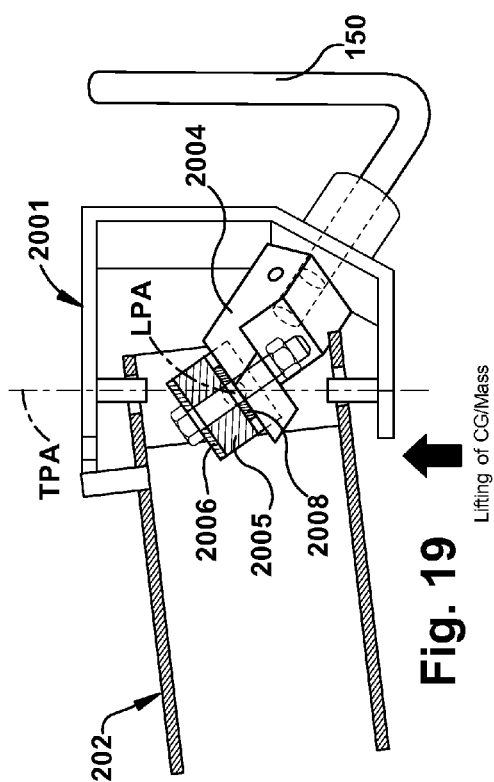

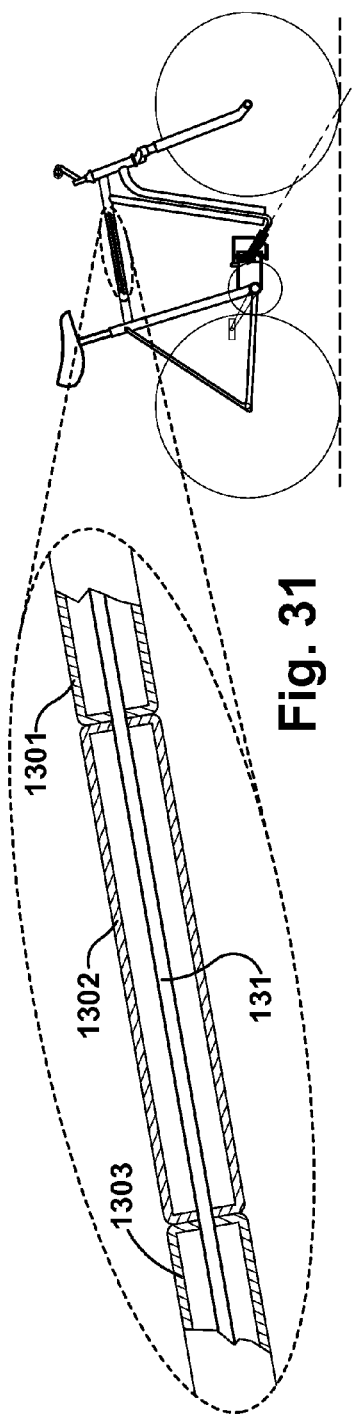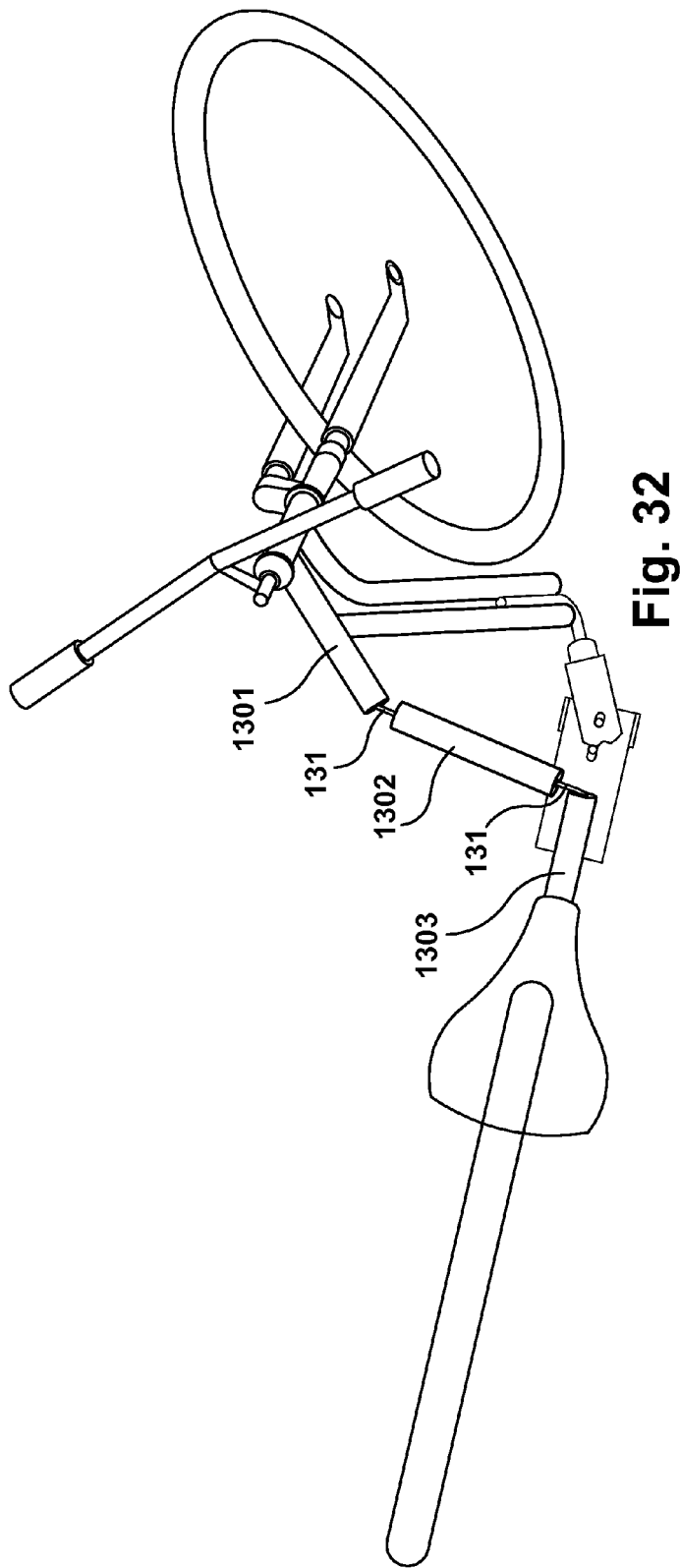

ARTICULATED TWO-WHEELED VEHICLES

RELATED APPLICATIONS

This application is a U.S. National Stage Application filing under 35U.S.C. §371 of, and claims priority to each of, patent cooperative treaty (PCT) Application Ser. No. PCT/US 2013/076106, filed on Dec. 18, 2013, which claims priority to U.S. Provisional Application No. 61/738,626, filed Dec. 18, 2012. The entire disclosures of the PCT Application and the Provisional Application are hereby incorporated by reference herein in their respective entireties.

FIELD OF THE INVENTION

The present disclosure and related inventions are in the general field of vehicles, particularly two-wheeled vehicle including bicycles.

BACKGROUND

Two-wheeled vehicles such as a bicycles and motorcycles are commonly constructed with a single unibody type frame which extends from or between a front wheel and a rear wheel, with a front component of the frame or fork to which the front wheel is attached being attached to the main body of the frame by a pivot to allow the front wheel to be turned about the pivot relative to the frame. The front fork pivot is defined by a cylindrical receiver located at a forward end of the frame and oriented at a forward angle, and a fork post which fits and rotates within the receiver.

The rear section of the frame is typically of a fixed configuration so that the rear wheel generally follows the track of the front wheel, as shown for example in FIG. 8B, FIG. 9B and FIG. 11. As well known in the mechanics and physics of two-wheeled vehicles, with the rear wheel permanently aligned with the frame turning requires leaning of the frame in the direction of the desired turn. At speed, the required directional leaning is induced by counter-steering the front wheel, which is a momentary turning of the front wheel in a direction opposite to the desired turn direction. Once the lean of the frame is initiated in this manner the front wheel is then pivoted back to center and further in the direction of the turn and defines the outer radius of the turn path, as shown in FIGS. 8B and 9B.

SUMMARY OF THE DISCLOSURE AND RELATED INVENTIONS

The present invention provides a novel two-wheeled vehicle which has an articulated frame assembly which enables independent steering of a front wheel and a rear wheel by articulation of the frame by operation of an articulated frame joint located between front and rear frame sub-assemblies.

The disclosure and related inventions include articulated two-wheeled vehicles with front and rear frame sub-assemblies or sub-frames which are interconnected by an articulated frame joint which enables variable relative motion and displacement of the front and rear frame sub-assemblies for both straight path and turning motions. In accordance with the general principles and concepts of the disclosure and related inventions, the articulated frame joint is configured to allow the front frame sub-assembly to be angularly displaced relative to the rear frame sub-assembly through available degrees of roll angle as indicated and described, and to allow the front frame sub-assembly to be displaced laterally of the rear frame sub-assembly through available degrees of yaw angle as indicated and described. Accordingly any particular configuration of the front and rear frame sub-assemblies and the articulated frame joint which enable this interaction and relative displacements and motions are within the scope of this disclosure and the related inventions.

In accordance with the general concepts and principles of the disclosure and related inventions, there is provided a two-wheeled vehicle having an articulated frame assembly including a front frame sub-assembly; a rear frame sub-assembly; an articulated frame joint connecting the front and rear frame sub-assemblies, the articulated frame joint having a housing, a swing bracket pivotally mounted to the housing, and a front frame tie rod receiver extending from the swing bracket; a front frame tie rod extending from the articulated frame joint to the front frame sub-assembly.

These and other aspects and features of the inventive concepts disclosed herein are further disclosed and described in detail herein with reference to the accompanying drawing figures.

BRIEF DESCRIPTION OF THE FIGURES

FIG. 2 is an enlarged perspective view of an articulated frame joint of the articulated two-wheeled vehicle of FIG. 1;

FIG. 3 is an exploded assembly view of the articulated frame joint of FIG. 2;

FIG. 5 is a side elevation schematic of an articulated two-wheeled vehicle of the present disclosure;

FIG. 6 is a top view schematic of an articulated two-wheeled vehicle of the present disclosure;

FIG. 7 is a front elevation schematic of an articulated two-wheeled vehicle of the present disclosure;

FIG. 15 is a top view of the articulated frame joint of FIG. 13 in a centered position;

FIG. 16 is a side view of the articulated frame joint of FIG. 13;

FIG. 17 is an end view of the articulate frame joint of FIG. 13;

FIG. 18 is a top view of the articulated frame joint of FIG. 13 in a turned position;

FIG. 19 is a side view of an alternate embodiment of an articulated frame joint of the present disclosure;

FIG. 20 is an end view of an articulated frame joint of the present disclosure in a turned position;

FIG. 31 is a profile view of an articulated two-wheeled vehicle of the disclosure and detail of a frame cross member;

FIG. 32 is a top view of the articulated two-wheeled vehicle of FIG. 31 in a turned configuration;

DETAILED DESCRIPTION

Figure 1:
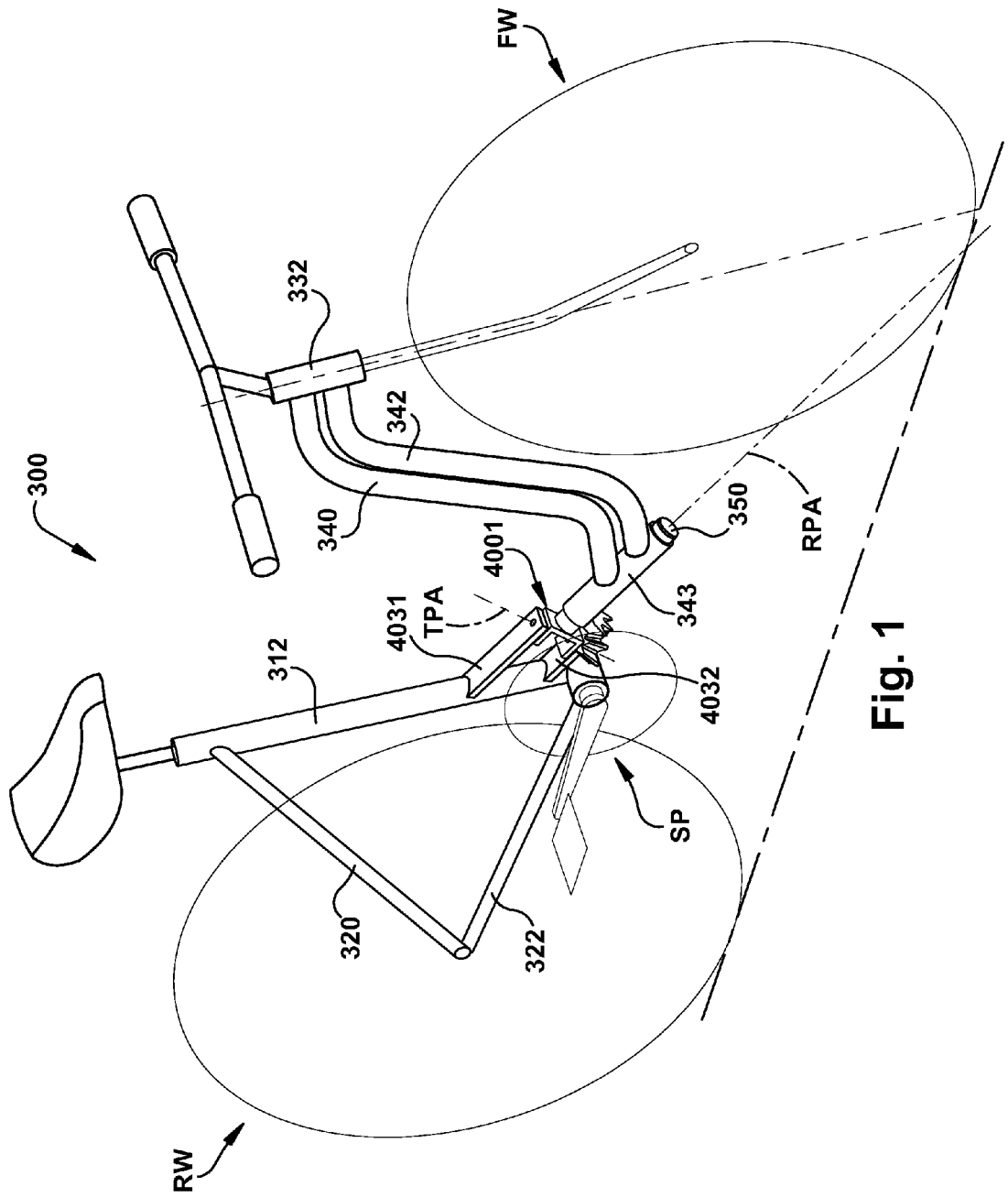
FIG. 1 is a perspective view of a representative embodiment of an articulated two-wheeled vehicle of the present disclosure.
Figure 4:
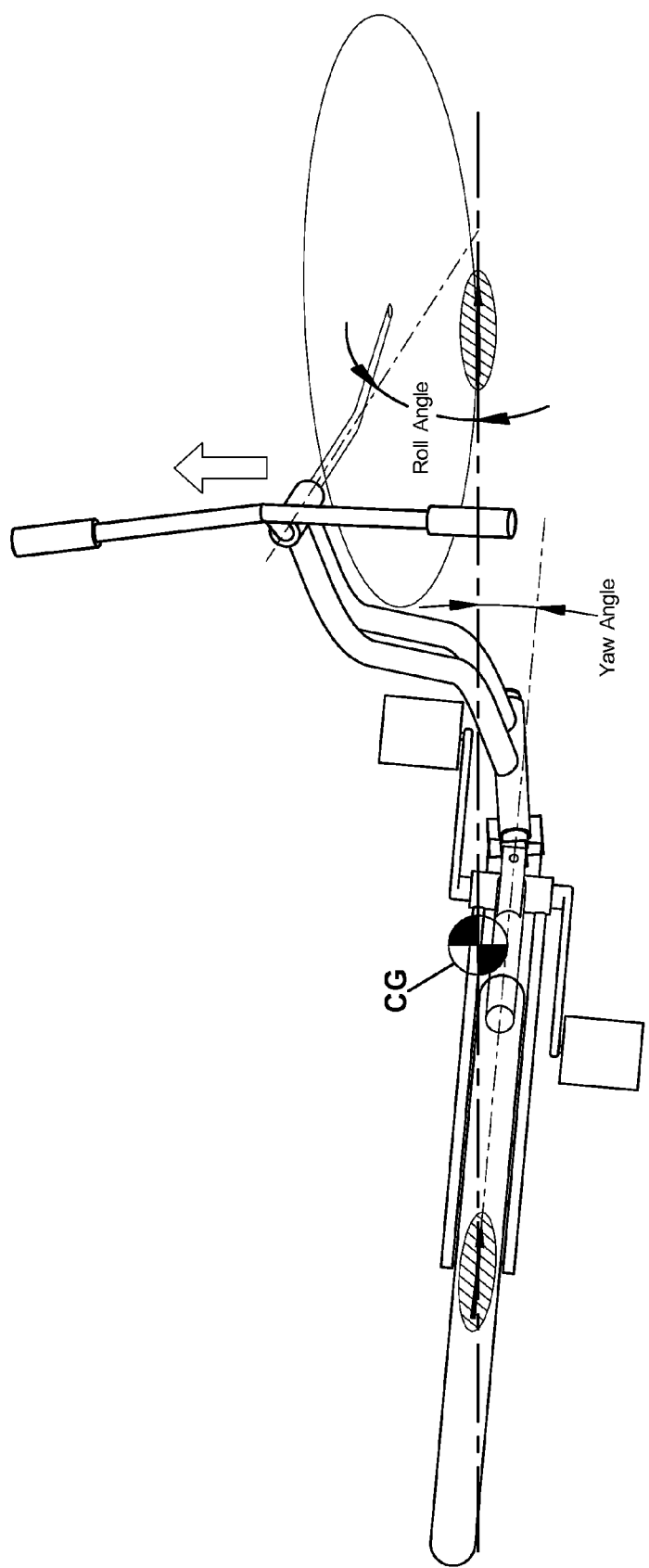
FIG. 4 is a top view of an articulated two-wheeled vehicle of the present disclosure.
Figure 8B:
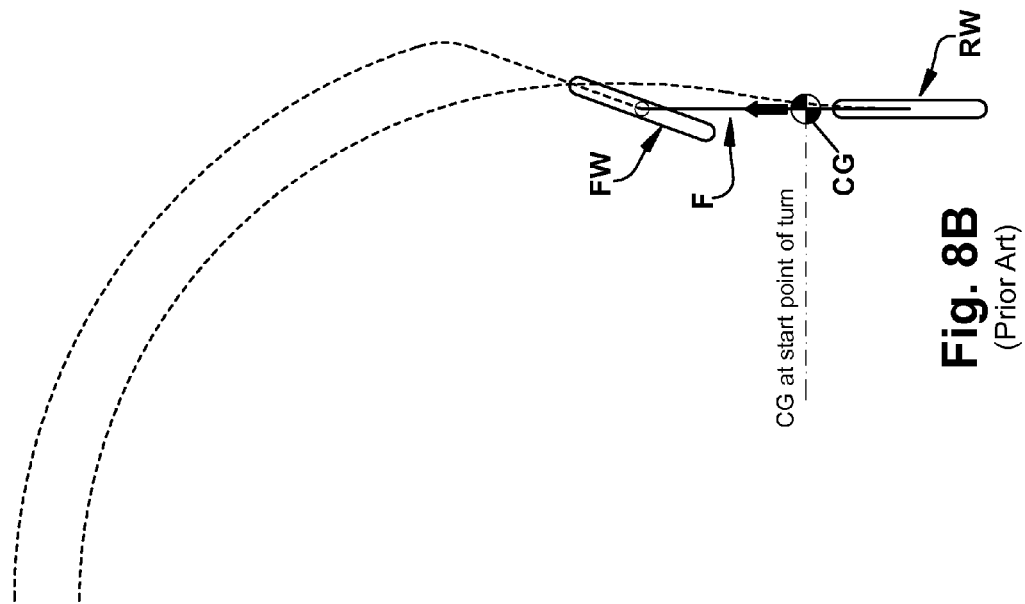
FIG. 8B is a schematic top view of a prior art two-wheeled vehicle and indicated turning path.
Figure 8A:
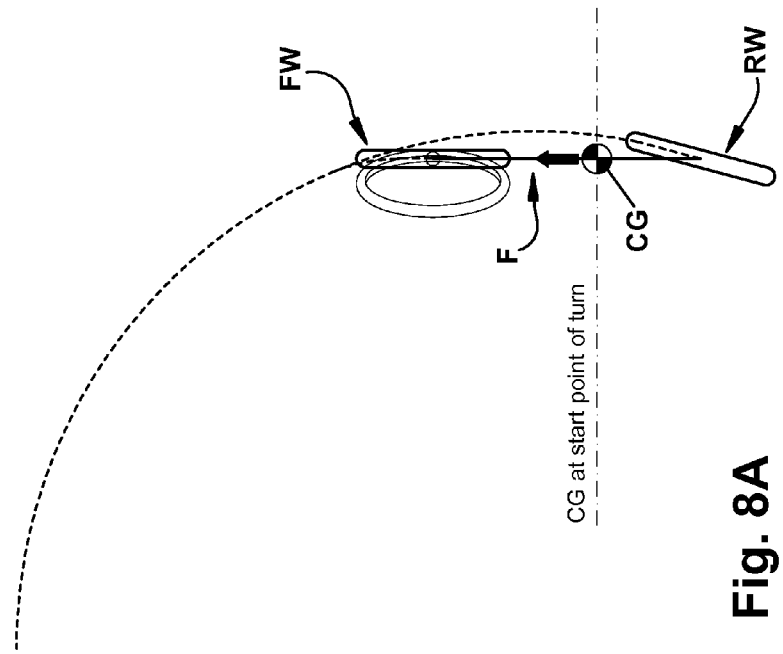
FIG. 8A is a schematic top view of an articulated two-wheeled vehicle of the present disclosure and indicated turning path.
Figure 9B:
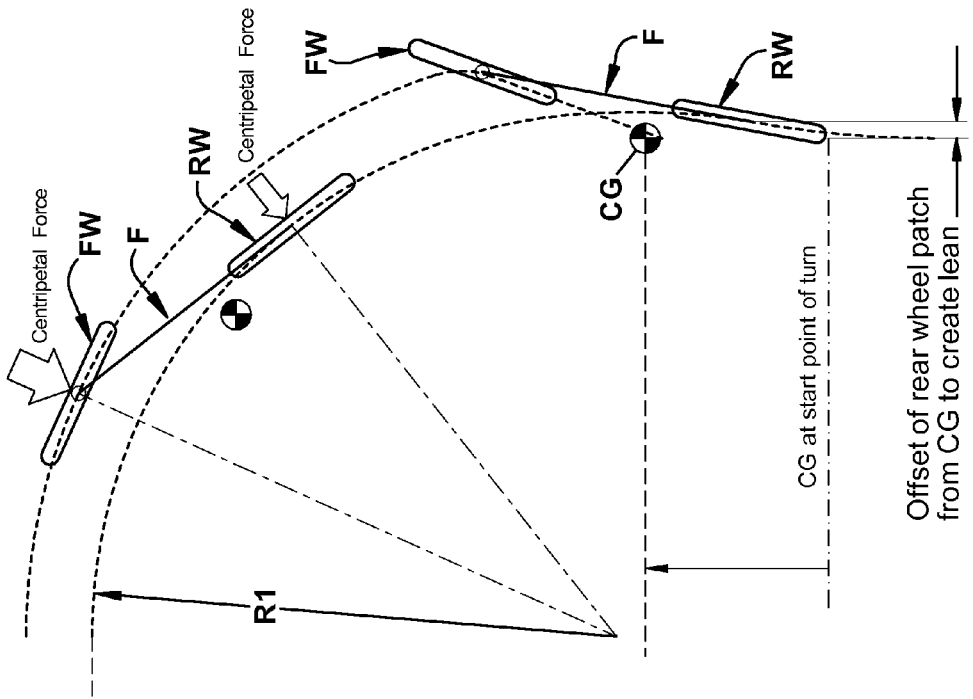
FIG. 9B is a schematic top view of a prior art two-wheeled vehicle and indicated turning path.
Figure 9A:
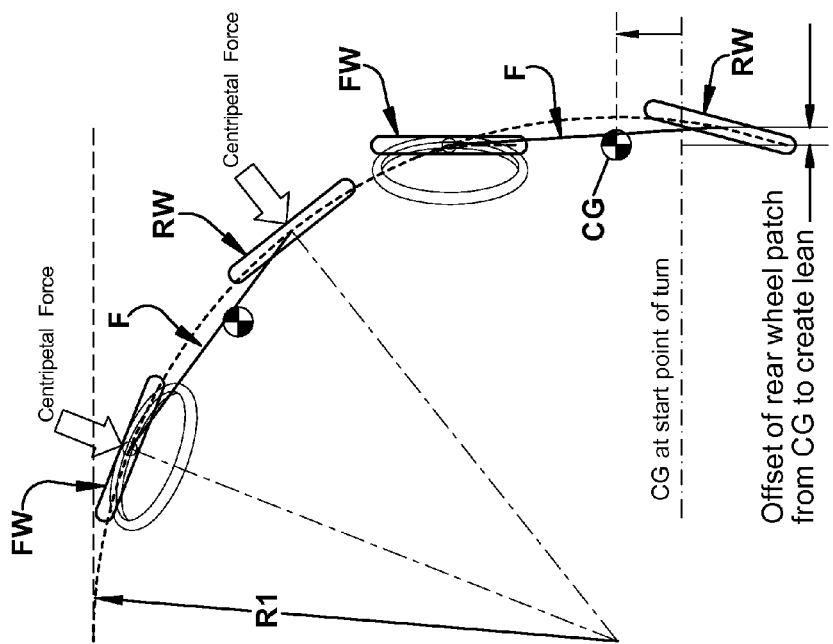
FIG. 9A is a schematic top view of an articulated two-wheeled vehicle of the present disclosure and indicated turning path.
Figure 11:
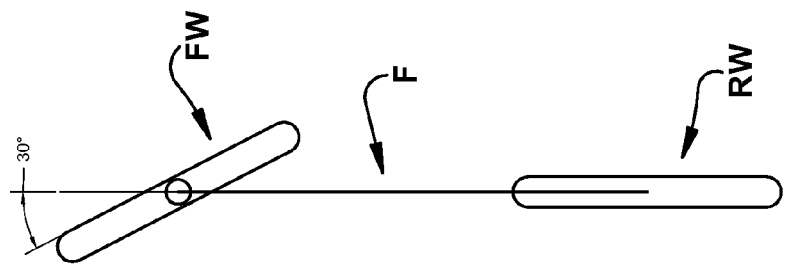
FIG. 11 is a schematic top view diagram of front and rear wheel positions of a prior art two-wheeled vehicle indicating respective orientations of the front and rear wheels with the vehicle in a turning configuration.
Figure 10:
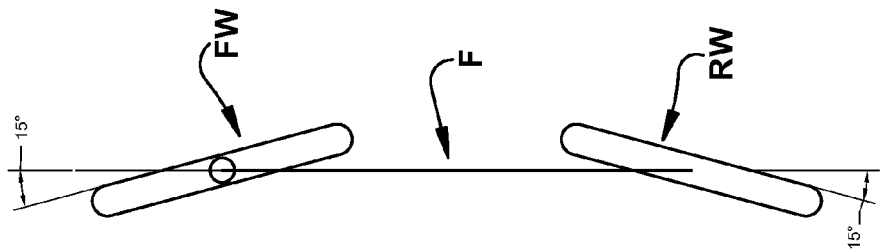
FIG. 10 is a schematic top view diagram of front and rear wheel positions of an articulated two-wheeled vehicle of the present disclosure indicating respective orientations of the front and rear wheels with the vehicle in a turning configuration.
Figure 12:
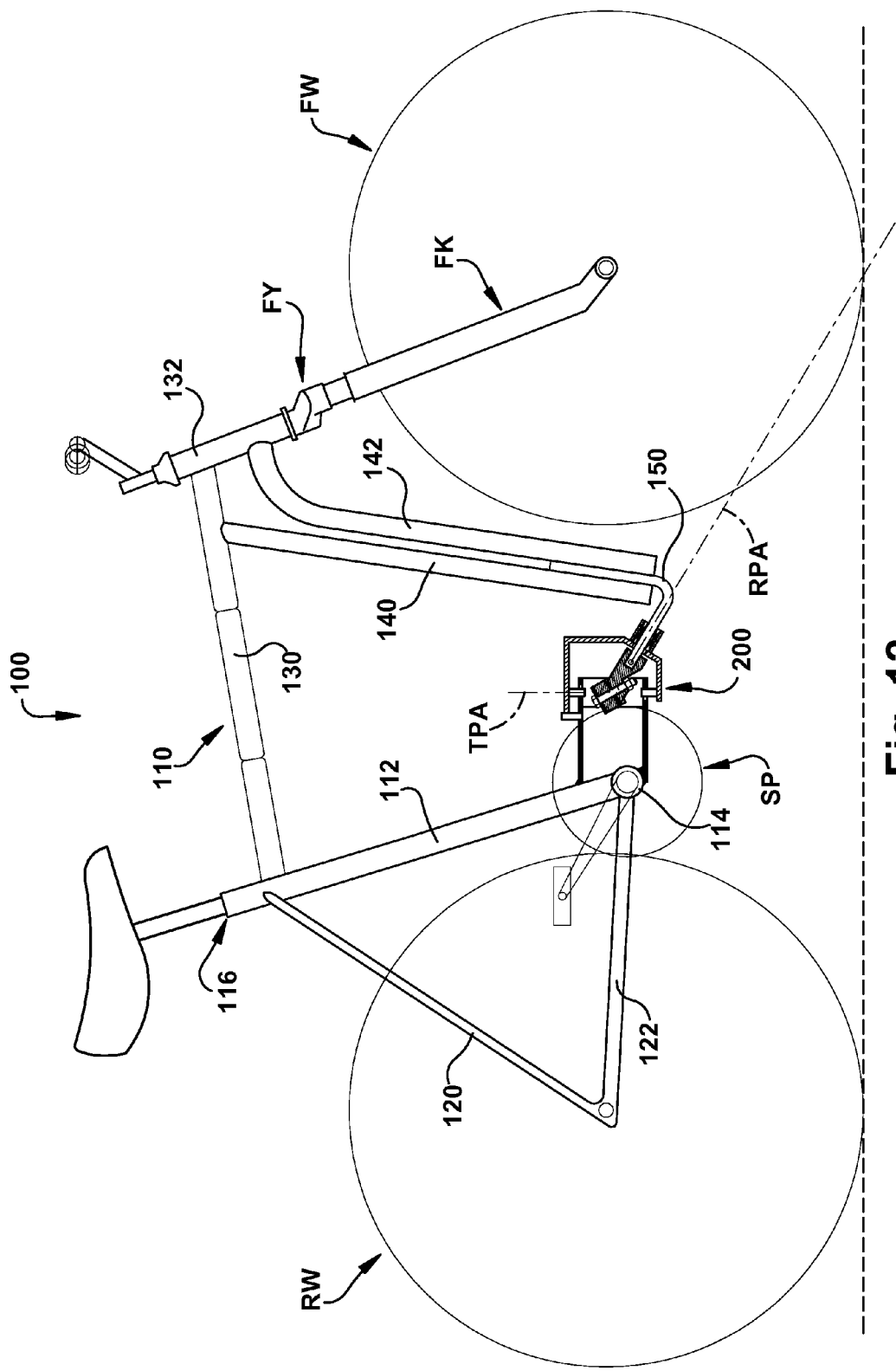
FIG. 12 is a side elevation of an alternate embodiment of an articulated two-wheeled vehicle of the present disclosure.

The disclosed representative and preferred embodiments of articulated vehicle frames, articulated frame joints and articulated two-wheeled vehicles enable motion and turning motion of front and rear wheels, as described with reference to FIGS. 8A, 9A, 10 and 11. As shown in FIG. 8A, the ability of the rear wheel RW to turn out of alignment with a frame F, and more particularly to turn in a direction opposite to a turn orientation of the front wheel FW, defines a single arced turn path as indicated, as compared to the dual arc turn path of a conventional two-wheeled vehicle of the prior art as shown in FIG. 8B. Also of note is the difference in turn initiation wherein the front wheel FW of an articulated frame vehicle of the present disclosure as shown in FIG. 8A does not have to be counter-steered in a direction opposite to the turn direction, or radially outside of the single turn arc, as shown in FIG. 8B. FIGS. 9A and 9B similarly show in comparison the relative locations and paths of the center of gravity and acting centripetal forces on the articulated vehicle of the present disclosure (FIG. 9A) and a conventional rigid frame vehicle of the prior art (FIG. 9B); and in FIGS. 10 and 11 the relative angular orientations of the wheels to a centerline of the frame. The centripetal forces tend to be more even at each wheel of the articulated vehicle as opposed to a conventional vehicle where more centripetal force and friction is a result at the front wheel during a turn. The schematics of FIGS. 8 and 9 also reveal the shorter distance traveled with the articulated vehicle to create the proper tire patch offset to induce the lean necessary for turning.

FIGS. 5-7 schematically illustrate an exemplary embodiment of an articulated two-wheeled vehicle of the present disclosure, indicated generally at 100, the center of gravity CG location, roll angle, and yaw angle (FIG. 6). An articulated frame joint is indicated generally at 110. A turn pivot axis TPA and a roll pivot axis RPA, as indicated throughout the disclosure, are spatially related to the location of the articulated frame joint 110 of the vehicle 100, as indicated. The turn pivot axis TPA rotation defines the yaw angle of the rear frame sub-assembly. The roll pivot axis RPA rotation defines the roll angle of the front frame sub-assembly. The amount of turn pivot axis TPA rotation is determined by the amount of roll pivot axis RPA rotation. The amount of relative rotation is dictated by the particulary geometry of the frame F and the degress and ranges of motion of the components of the articulated frame joint 110. Also indicated on FIGS. 5-7 are exemplary angular orientations of certain members of the vehicle frame F and the force vectors to the ground, as further described. As noted, the articulated frame joint is configured to allow the front frame sub-assembly to be angularly displaced relative to the rear frame sub-assembly through available degrees of roll angle about a roll pivot axis, indicated RPA as indicated and described, and to allow the front frame sub-assembly to be displaced laterally of the rear frame sub-assembly through available degrees of yaw angle or turn pivot axis TPA as indicated and described.

FIGS. 12-17 depict a representative embodiment of an articulated two-wheeled vehicle of the present disclosure, indicated generally at 100, having a front wheel the location of which is indicated schematically at FW, a rear wheel the location of which is indicated schematically at RW, an articulated frame indicated generally at 110, an articulated frame joint indicated generally at 200. The articulated frame 110 includes the following frame components or members, which together in the described arrangements make up a front frame sub-assembly and and a rear frame sub-assembly. The rear frame sub-assembly includes an upright member 112 which extends generally from a sprocket bearing housing 114 to a seat post receiver end 116, first and second rear wheel arms 120 and 122. The front frame sub-assembly includes a fork F (comprising two parallel), a fork yoke FY, and forward members 140 and 142 which extend from cross bar 130 and/or fork receiver 132 generally downward and proximate to the location of the sprocket SP. A single unitary member may be substituted for the two forward members 140, 142 depicted. The cross bar 130 extends from the upright member 112 to a fork receiver 132. A front frame tie rod 150 extends from the forward members 140, 142 as shown. As illustrated in FIGS. 31 and 32, the main cross bar 130 may include multiple connected sub-members, 1301, 1302, 1303 commonly connected by an internally run elastic member 131 to enable multiple displacement configurations. Alternatively, the main cross bar 130 can be constructed of any suitable material in any number of components to provide structural strength to the frame and the required flexibility for the various modes of operation.

A front wheel fork F includes two parallel members, as further described which extend from a fork yoke FY. A fork post which extends from the fork yoke FY is inserted into the fork post receiver 132 of the frame 110 and is journalled to rotate within the fork post receiver 132. In this particular embodiment, the articulated frame joint 200 is located proximate to the sprocket SP, and proximate to the lower end of the upright member 112 and the lower ends of the forward members 140, 142.

Figure 13:
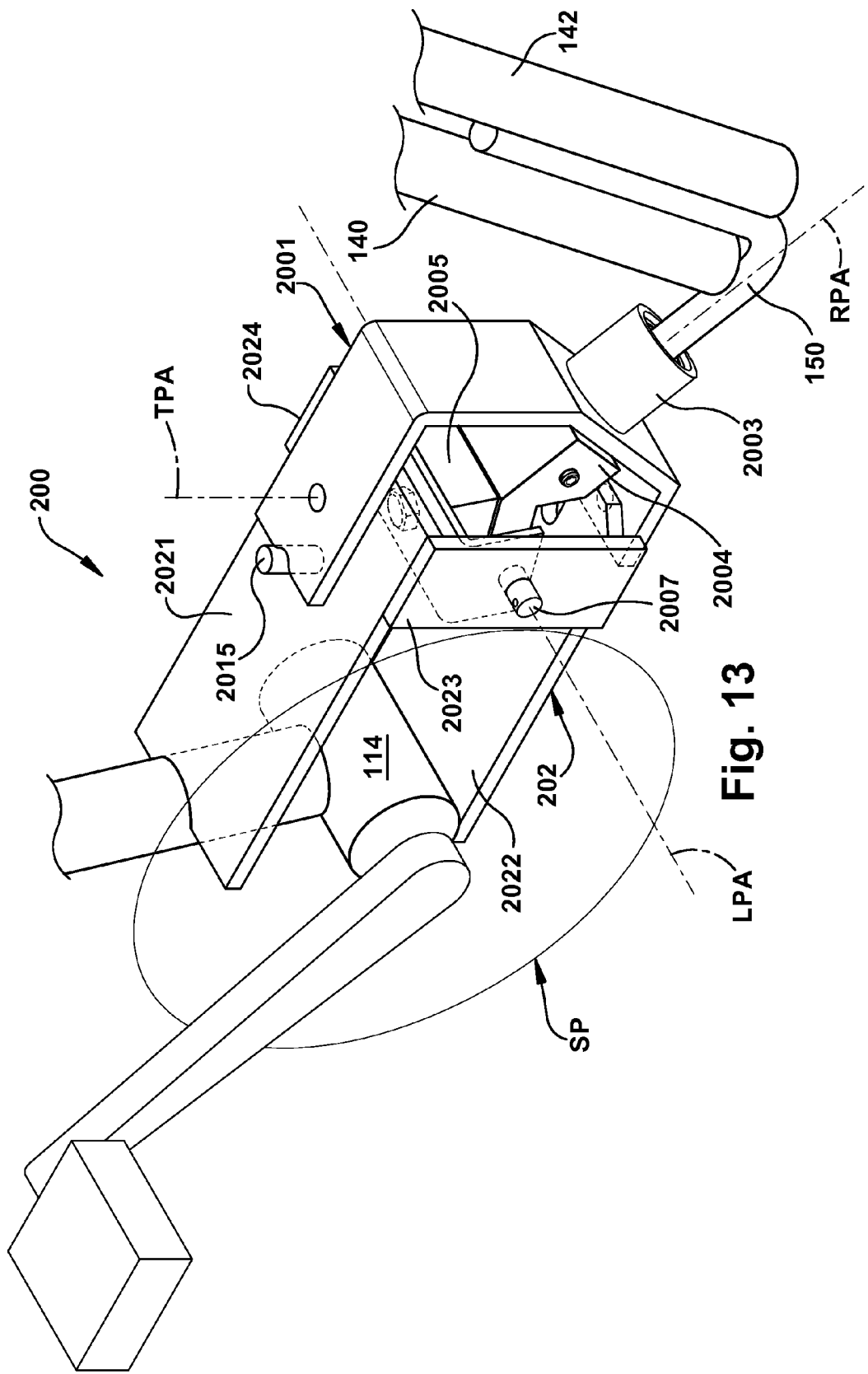
FIG. 13 is a perspective view of an articulated joint of a frame of an articulated two-wheeled vehicle of the present disclosure.
Figure 14:
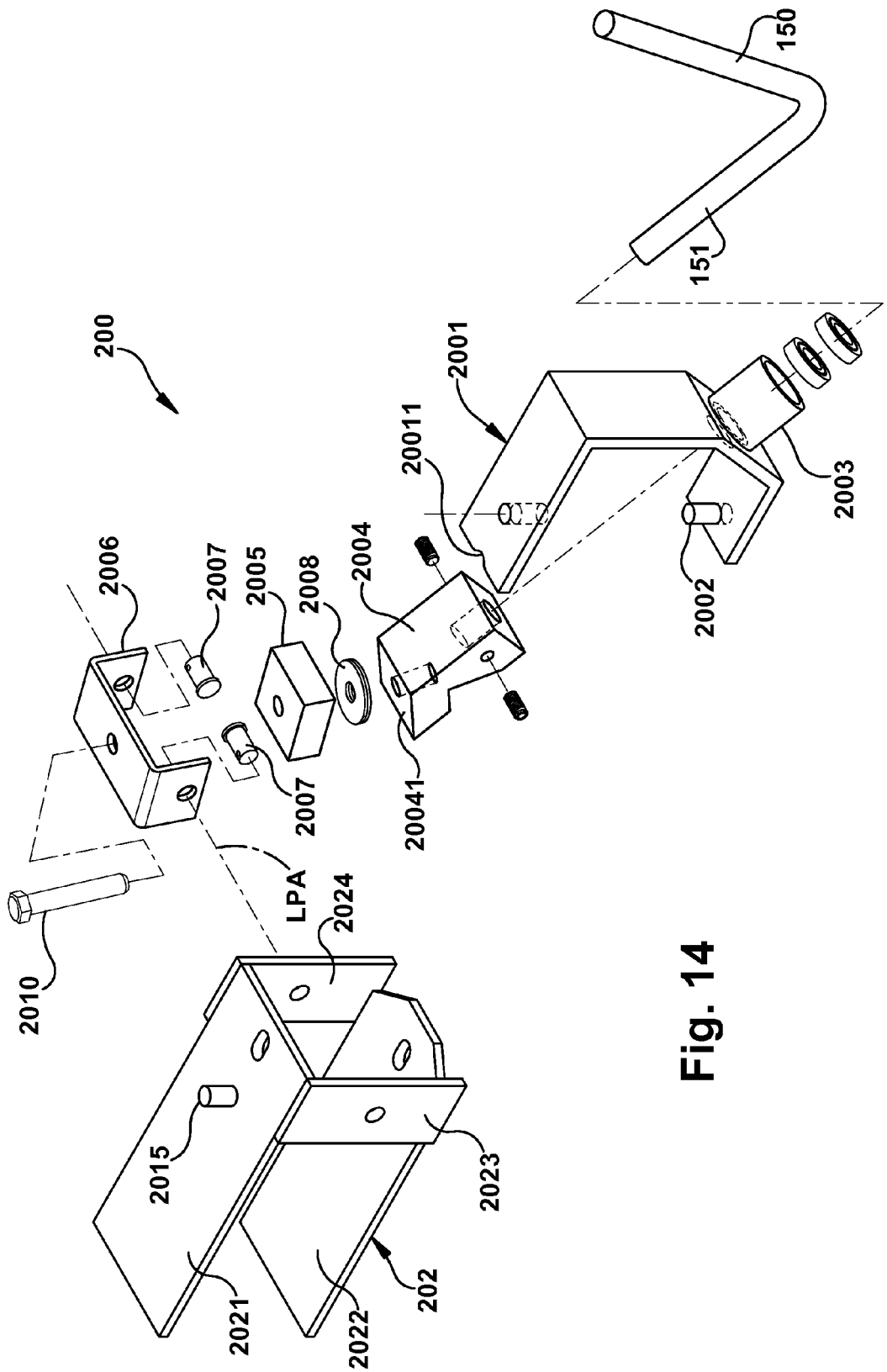
FIG. 14 is an exploded perspective assembly view of the articulated frame joint of FIG. 13.

The components of the articulated frame joint 200 are now described with additional reference to FIGS. 13 and 14. A housing 202 extends generally forward of the upright member 112 proximate to the sprocket SP and sprocket bearing housing 114, preferably by rigid connection such as by welds. The housing 202 preferably has an upper arm 2021 and a lower arm 2022 which are spaced apart in order to receive generally vertically mounted components as further described. The housing 202 also preferably includes side arms 2023 and 2024 which extend between the upper and lower arms 2021, 2022 and disposed laterally of the generally planar upper and lower arms 2021, 2022, and generally configured to receive a horizontally mounted component therebetween as further described. Although, the housing 202 of this particular embodiment is in the general form of a box frame, other configurations of the housing 202 which support the cooperating components are possible and within the scope of the present disclosure.

Figure 36:
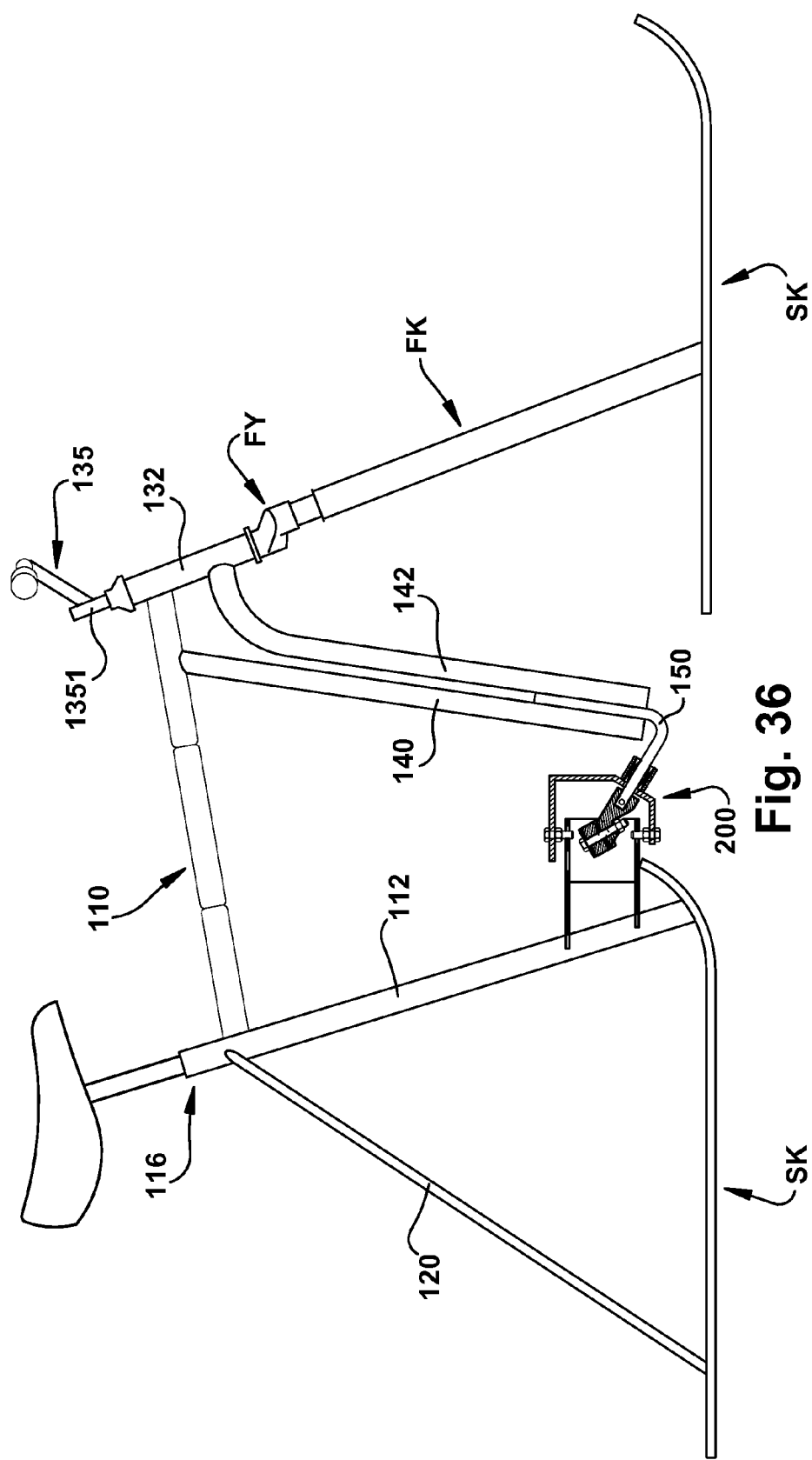
FIG. 36 is a schematic side view of an alternate embodiment of an articulated frame vehicle of the present disclosure.
Figure 37:
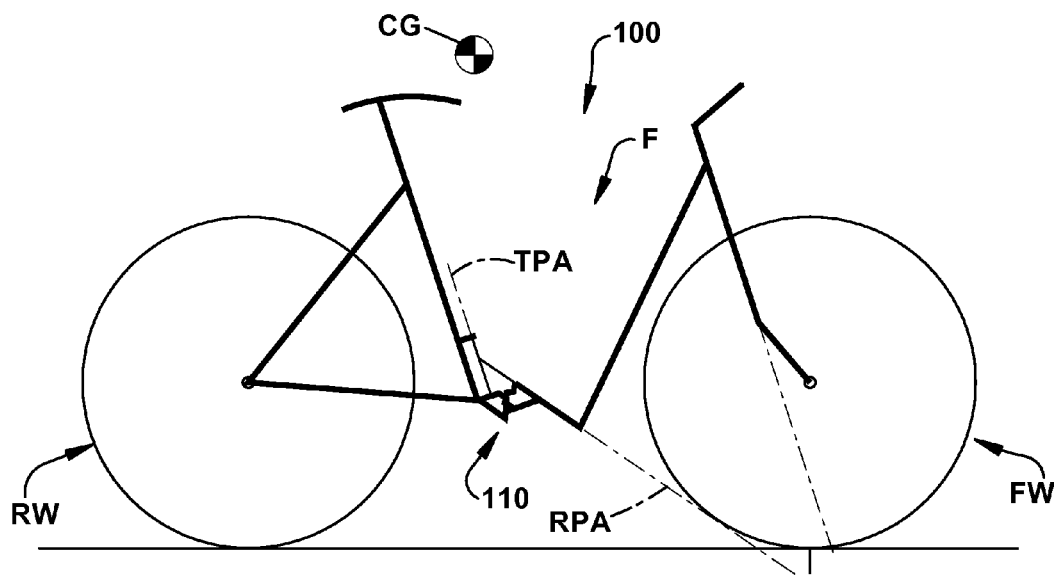
FIG. 37 is a side elevation schematic of an alternate embodiment of an articulated two-wheeled vehicle of the present disclosure.
Figure 38:
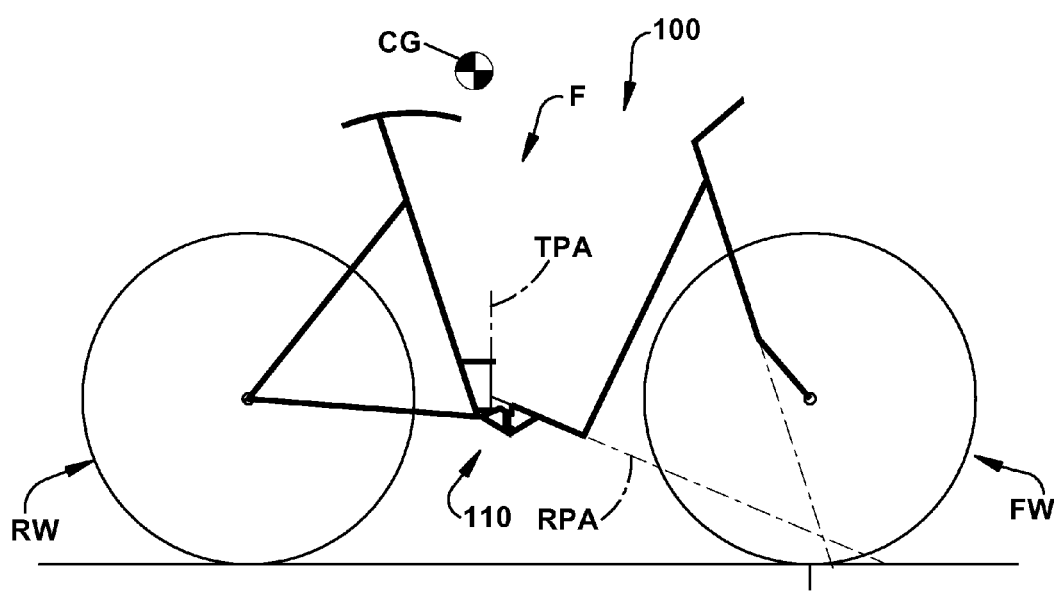
FIG. 38 is a side elevation schematic of an alternate embodiment of an articulated two-wheeled vehicle of the present disclosure.
Figure 39:
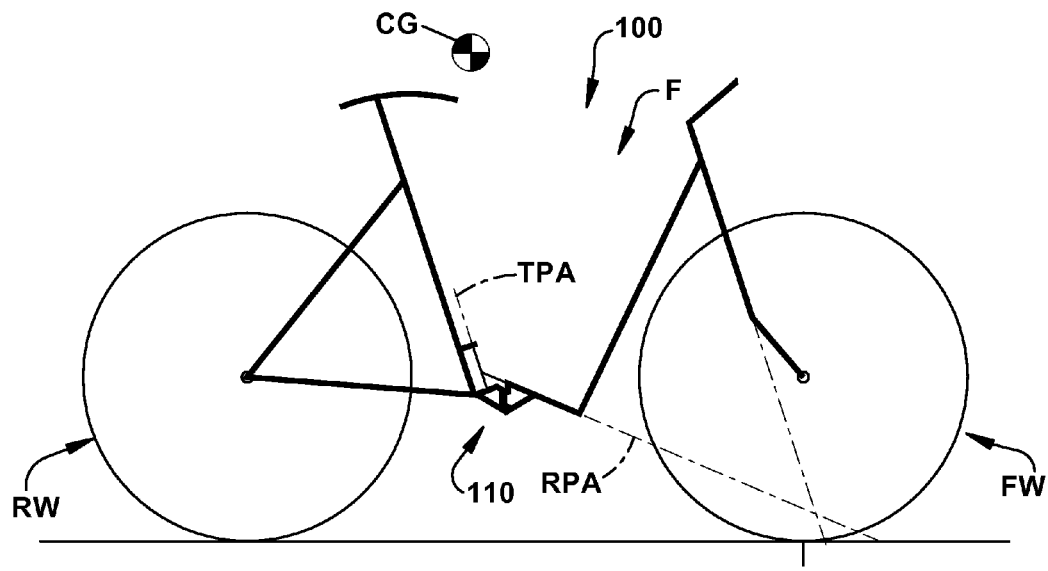
FIG. 39 is a side elevation schematic of an alternate embodiment of an articulated two-wheeled vehicle of the present disclosure.
Figure 40:
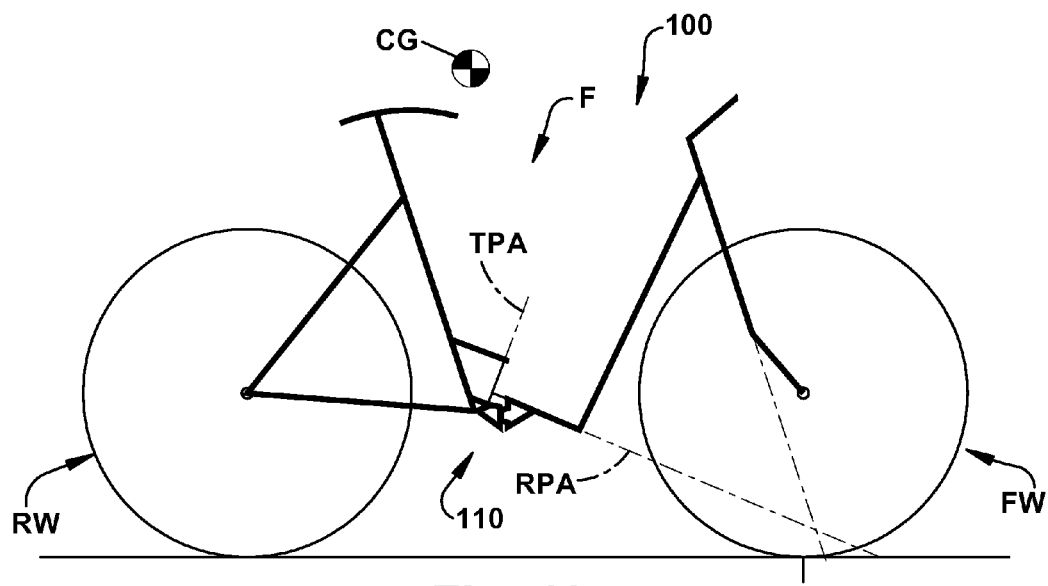
FIG. 40 is a side elevation schematic of an alternate embodiment of an articulated two-wheeled vehicle of the present disclosure.
Figure 41:
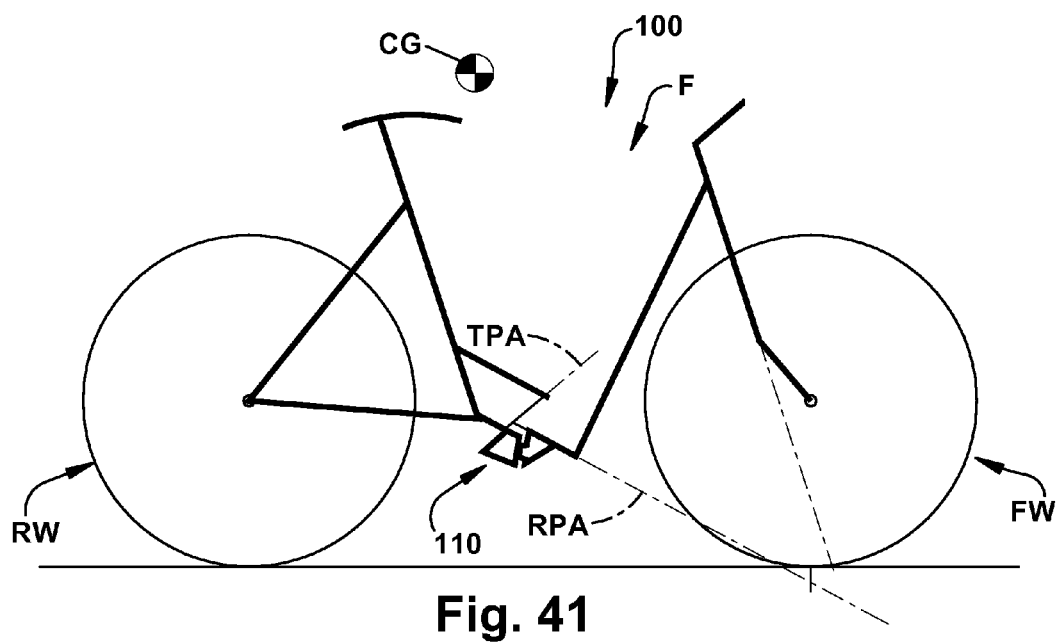
FIG. 41 is a side elevation schematic of an alternate embodiment of an articulated two-wheeled vehicle of the present disclosure.
Figure 42:
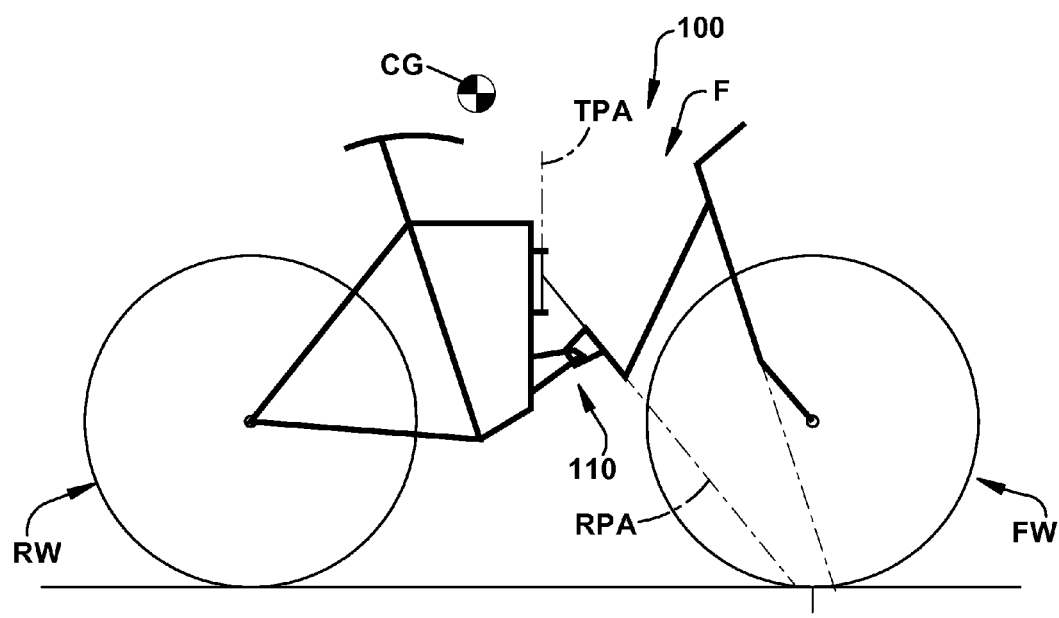
FIG. 42 is a side elevation schematic of an alternate embodiment of an articulated two-wheeled vehicle of the present disclosure.

As further shown in FIGS. 13 and 14, the articulated frame joint 200 includes a swing bracket 2001 pivotally mounted to the housing 202 by upper and lower pins 2002. A bushing 2003 extends from a forward region of the swing bracket 2003 and is journalled to receive the front frame tie rod 150 for rotation therein. A distal end 151 of the front frame tie rod 150 is attached to a cam block 2004 which is mounted within the swing bracket 2003 by king pin 2010 connection to a relief pivot carriage 2006 which is pivotally connected to the side arms 2023, 2024 of the housing 202 by pins 2007. A spacer block 2005 and/or thrust bearing 2008 can be provided between the cam block 2004 and the relief pivot carriage 2006. As shown in FIG. 36, the same or similar frame and articulated frame joint as just described can be embodied in a non-wheeled vehicle such as a slide or ski vehicle wherein skis SK are attached to the frame 110 in place of wheels and turning and maneuvering is accomplished through the mechanism as described.

Figure 21:
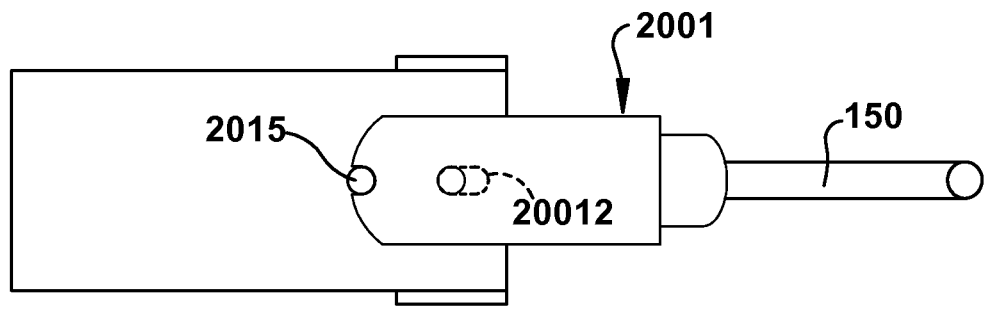
FIG. 21 is a top view of an articulated frame joint of the present disclosure in a centered and locked position.
Figure 22:
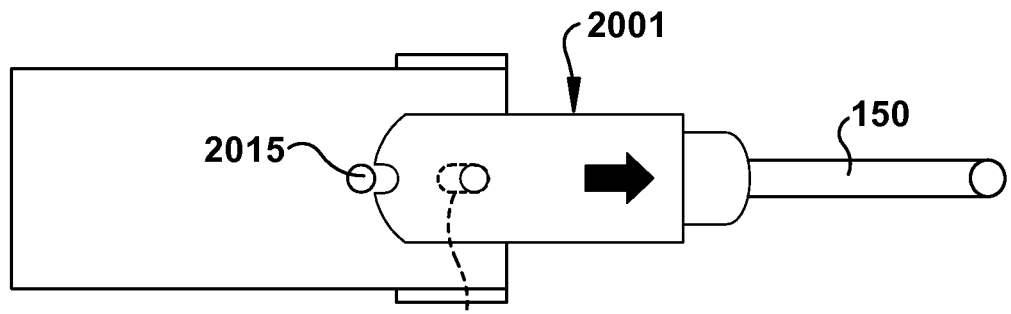
FIG. 22 is a top view of an articulated frame joint of the present disclosure in a centered and unlocked position.
Figure 23:
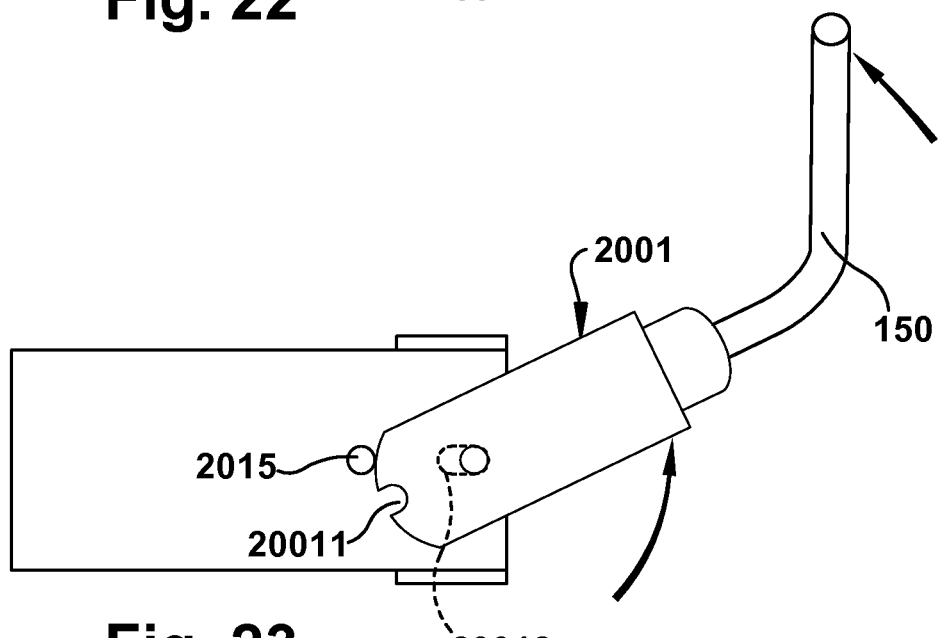
FIG. 23 is a top view of an articulated frame joint of the present disclosure in a turned position.

As further illustrated in FIGS. 15-20, a centering pin 2015 can be provided for example in the upper arm 2021 of the housing 202, to releasably engage with a detent 20011 formed in an edge of the swing bracket 2001, shown in an engaged and centered position in FIG. 15, and in a turned position in FIGS. 18-20. As shown in FIGS. 18-20, when the centering pin 2015 translates out of the detent 20011 it causes a rotation at the lift pivot axis LPA raising that point in relation to the wheel contact patches of the riding surface. This prevents unintended rotation of the pivots while pedaling and in particular standing and pedaling. As further illustrated in FIGS. 21-23, elongated receiver holes 20012 for the upper and lower pins 2002 allow for forward shifting of the swing bracket 2001 for disengagement with the centering pin 2015 (FIG. 22) and rotation to a turned position (FIG. 23). As illustrated a trailing edge of the swing bracket 2001 may be formed generally arcuate and provide a bearing surface against centering pin 2015.

In FIG. 16 the angle of the kingpin 2010 will determine how much turn pivot axis TPA rotation will result with rotation of the roll pivot axis RPA. That angle can be defined by the angle of the through hole on the cam block 2004 and the thrust bearing 2008 mating surface 20041. A more vertical kingpin 2010 axis angle would cause a larger turn pivot axis TPA rotation in relation to the roll pivot axis RPA rotation.

Figure 24:
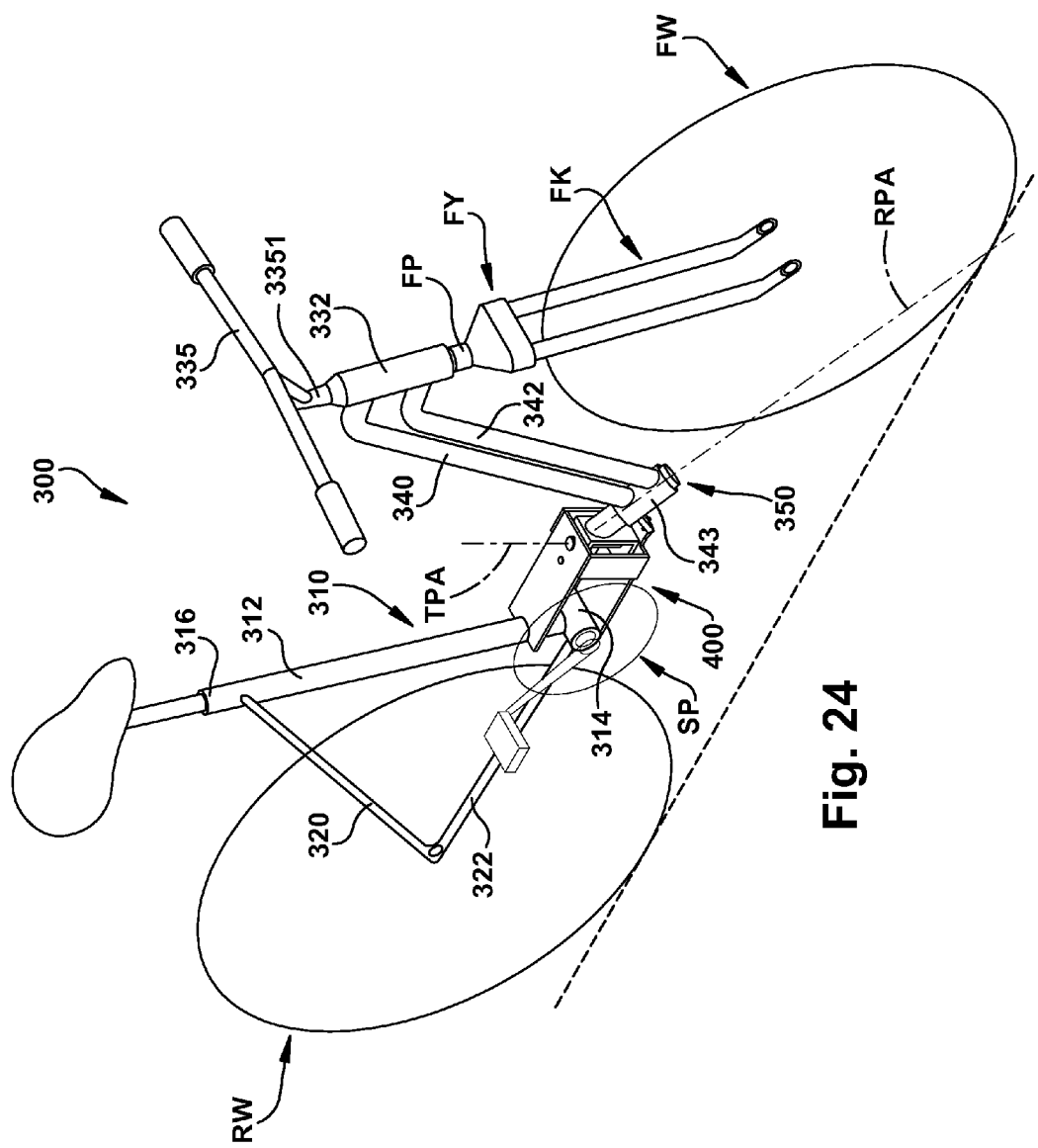
FIG. 24 is a perspective view of an alternate embodiment of an articulated two-wheeled vehicle of the present disclosure.
Figure 25:
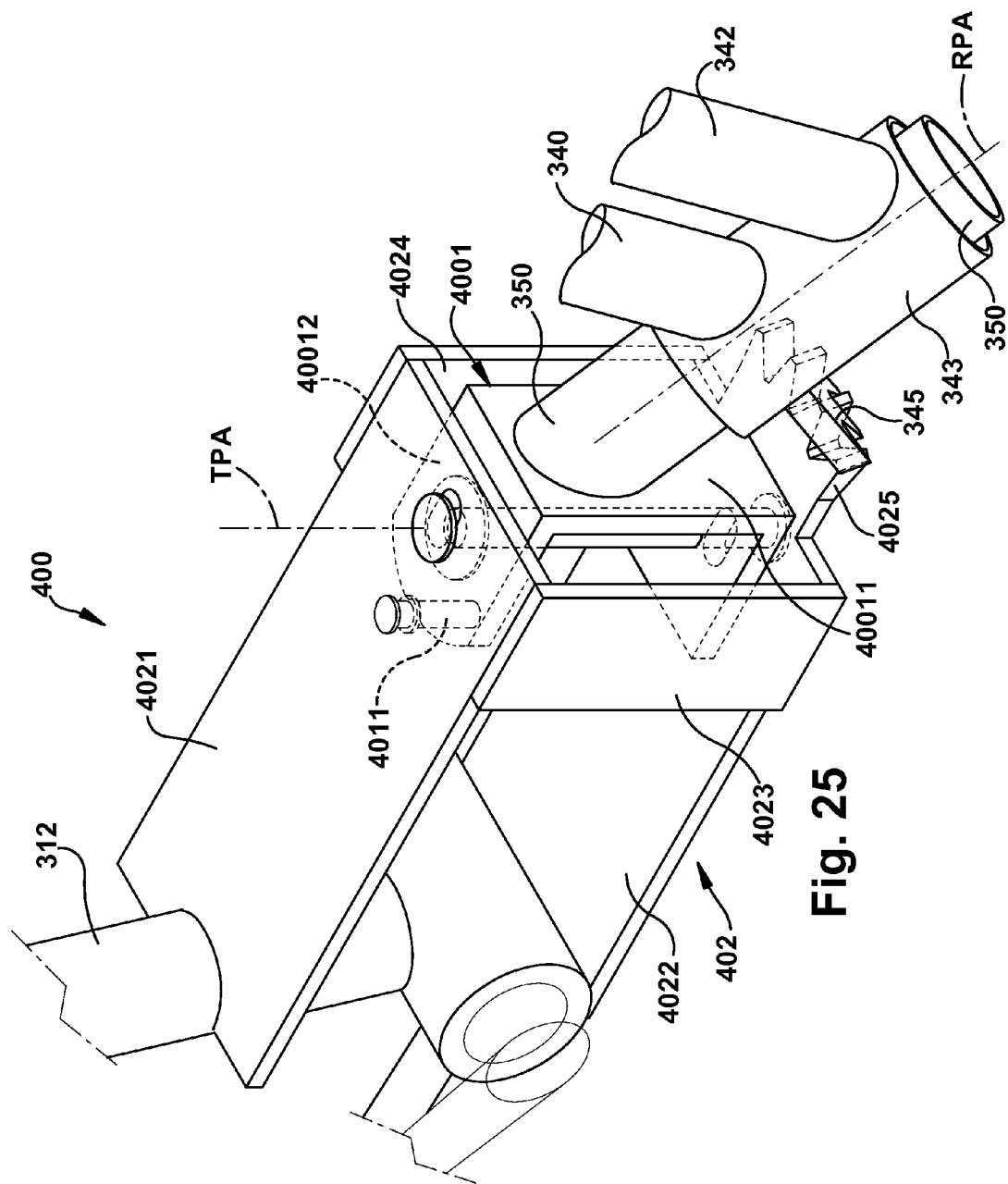
FIG. 25 is an enlarged perspective view of the articulated joint of a frame of FIG. 24.
Figure 26:
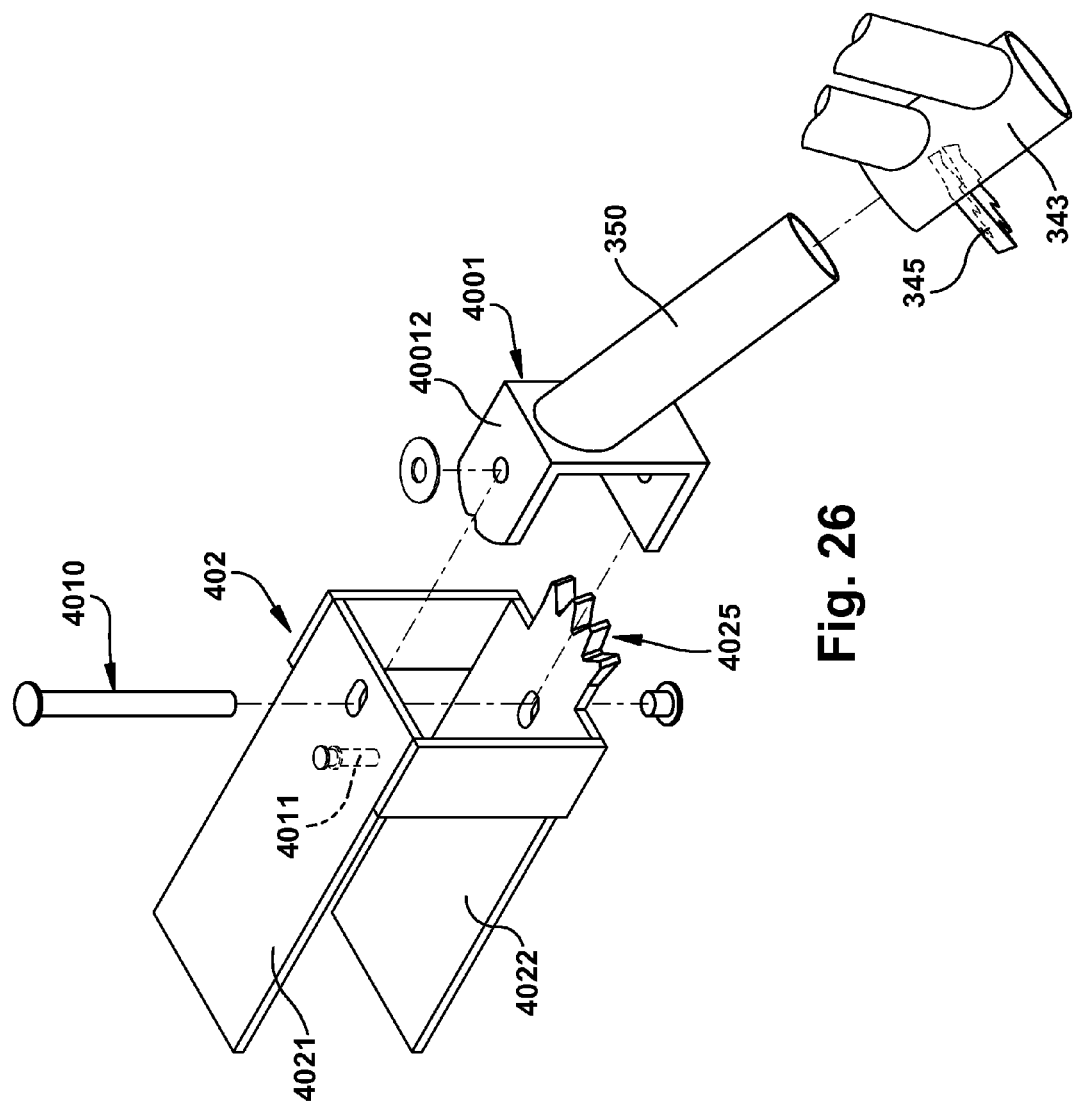
FIG. 26 is an exploded perspective assembly view of the articulated frame joint of FIG. 24.
Figure 27:
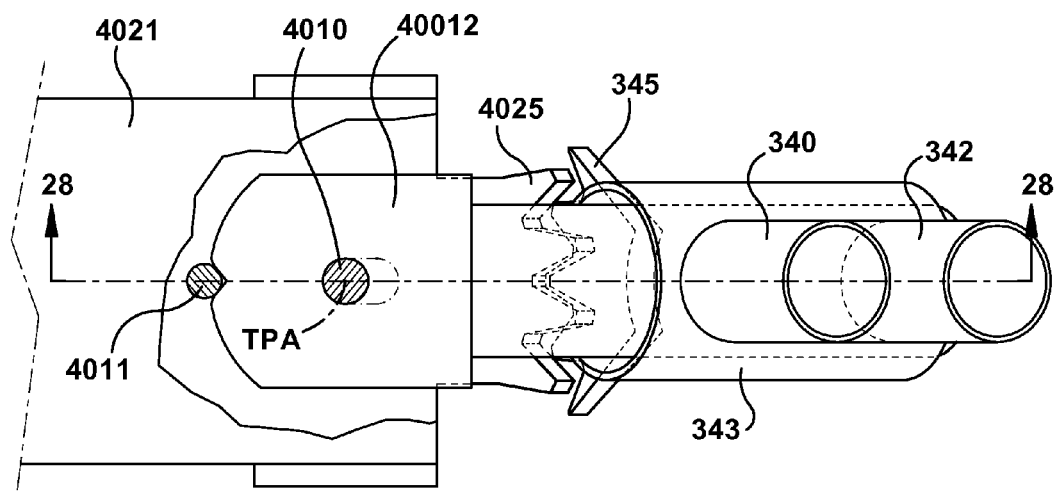
FIG. 27 is a top view of the articulated frame joint of FIG. 24.
Figure 28:
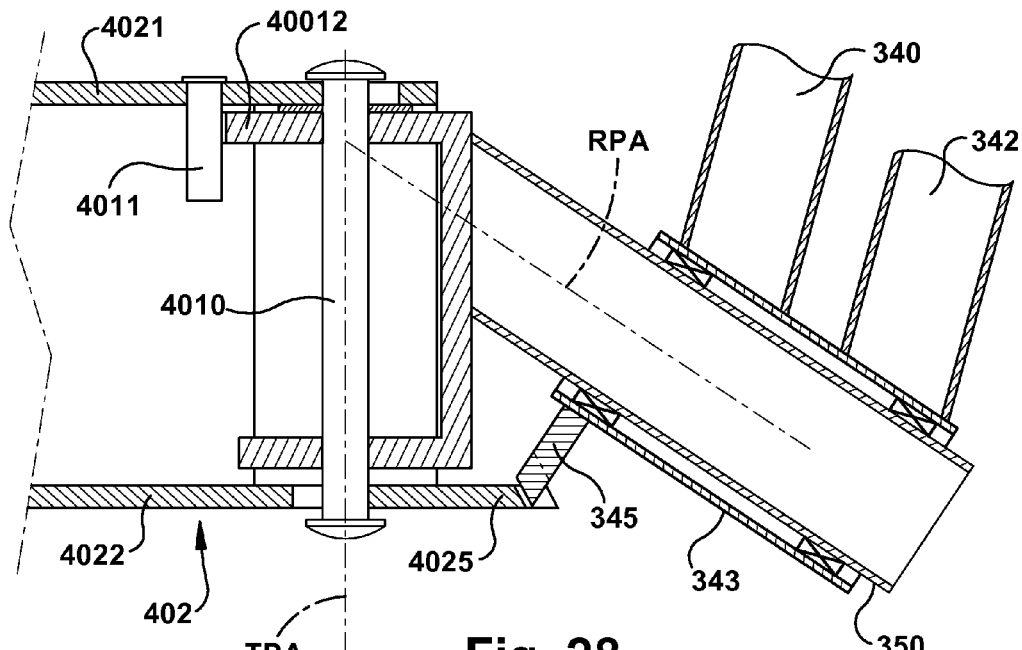
FIG. 28 is a cross-sectional view of the articulated frame joint of FIG. 24 as indicated thereon.
Figure 29:
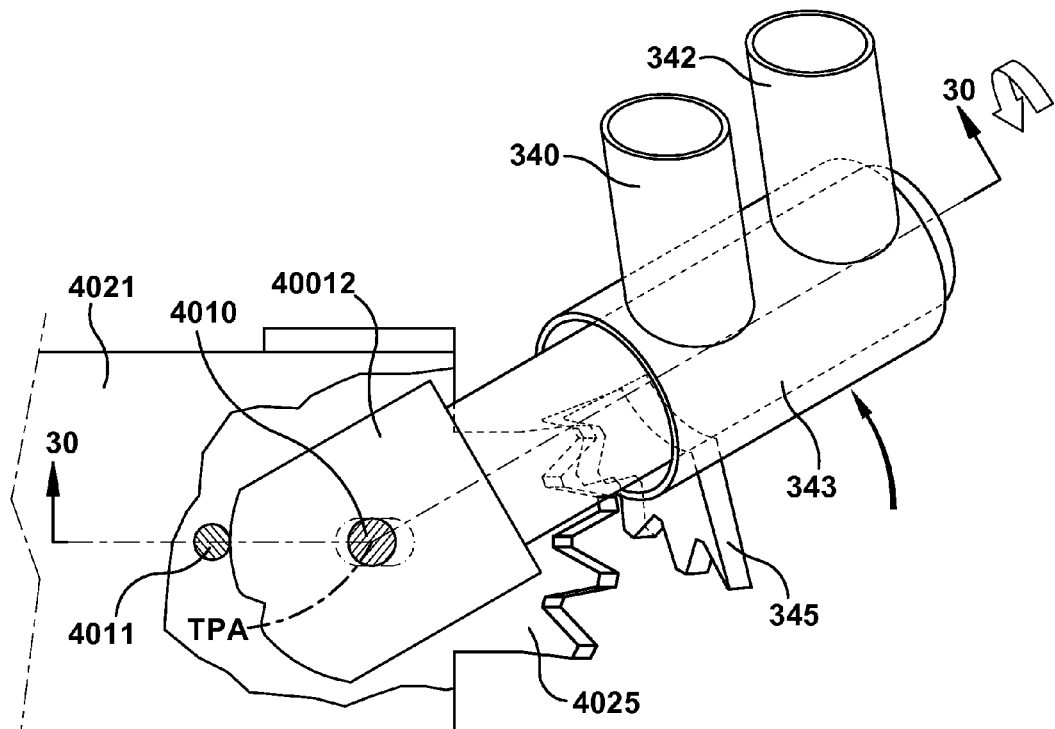
FIG. 29 is a top view of the articulated frame joint of FIG. 24 in a turned position.
Figure 30:
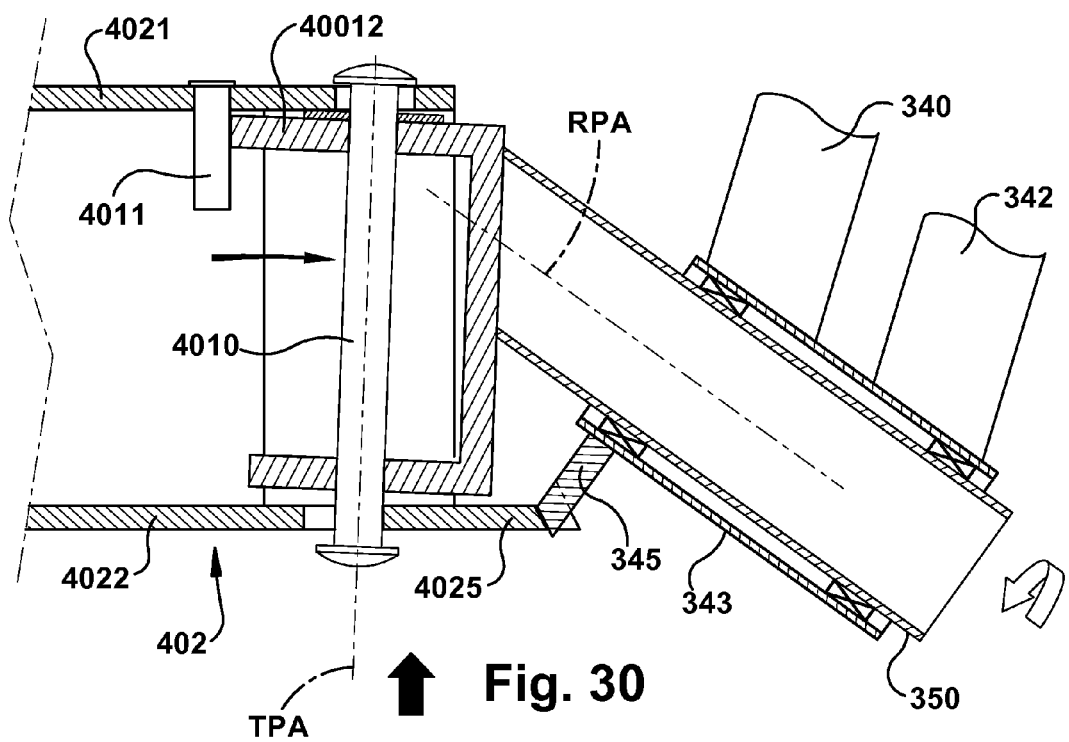
FIG. 30 is a cross-sectional view of the articulated frame joint of FIG. 29 as indicated thereon.

FIGS. 24-30 illustrate an alternate embodiment of an articulated two-wheeled vehicle of the present disclosure, indicated generally at 300 in FIG. 24. This embodiment has frame components for supporting a front wheel the location of which is indicated schematically at FW, a rear wheel the location of which is indicated schematically at RW, an articulated frame indicated generally at 310, an articulated frame joint indicated generally at 400. The articulated frame 310 includes the following frame components or members, an upright member 312 which extends generally from a sprocket bearing housing 314 to a seat post receiver end 316, first and second rear wheel arms 320 and 322 (for example in symmetrical pairs on opposing sides of the rear wheel RW), and forward members 340 and 342 which extend from the articulated frame joint 400 to a fork post receiver 332. Handlebars 335 are also received in receiver 332 opposite the fork post FP by insertion of handlebar post 3351 into receiver 332. In accordance with the general configuration of the various embodiments of the disclosure, the fork post FP and handlebar post 3351 are fixedly received and non-rotationally received in receiver 332. A single unitary member may be substituted for the two forward members 340, 342 depicted. A front frame tie rod 350 extends from a collar 343 at the lower distal ends of the forward members 340, 342 and extends into the articulated frame joint 400.

A front wheel fork F includes two parallel members, as further described which extend from a fork yoke FY. A fork post which extends from the fork yoke FY is inserted into the fork post receiver 332 of the frame 310 and is journalled to rotate within the fork post receiver 332. In this particular embodiment, the articulated frame joint 400 is located proximate to the sprocket SP, and proximate to the lower end of the upright member 312 and the lower ends of the forward members 340, 342.

The articulated frame joint 400 includes a housing 402 defined by an upper member 4021 and a lower member 4022 each of which extend forward of the upright frame member 312, and side members 4023 and 4024 which extend generally vertically between the upper and lower members 4022, 4023. A swing bracket 4001 is mounted for pivotal rotation within the housing 402 about pin 4010 (also referred to as "kingpin"). The front frame tie rod 350 extends forward from the swing bracket 4001, preferably angularly downward as illustrated. A set of beveled gear teeth 345 extend from an underside of the front frame collar 343 and are engaged with a mating set of beveled gear teeth 4025 which extend forward of the lower housing member 4022 (and can optionally be formed integral therewith). The mating surfaces of the gear teeth 343 and 4025 perform load-bearing rotational stability and control for pivoting motion of the swing bracket 4001 relative to housing 402. The beveled angles of the gear teeth 345, 4025 are preferably machined to match the angle of the front frame tie rod 350 relative to the forward facing surface 40011 of the swing bracket. A centering pin 4011 is mounted in the housing upper member 4021 to be received in a detent of an upper arm 40012 of the swing bracket 4001 as illustrated. Elongation of the kingpin-receiving holes in upper member 4021 and lower member 4022 of the housing 402 allows linear translation of the swing bracket 4001 relative to the housing 402 for engagement or disengagement with centering pin 4011 and corresponding movement of the front frame sub-assembly. Also, there is adequate clearance within the housing 402 for lateral displacement of the swing bracket 4001 therein, such as lateral tilt in combination with the rotation about pin 4010.

FIGS. 1-4 illustrate an alternate embodiment of the articulated two-wheeled vehicle 300 of FIGS. 24-30, wherein the swing bracket 4001 is supported solely by upper and lower members 4031 and 4032 which extend forward of the upright frame member 312. The swing bracket is pivot mounted about the axis indicated at distal ends of the upper and lower members 4031, 4032. The lower beveled gear 4025 can be formed integrally with the lower member 4032 or separately attached thereto, or be made to extend from the sprocket bearing housing 114.

Figure 33:
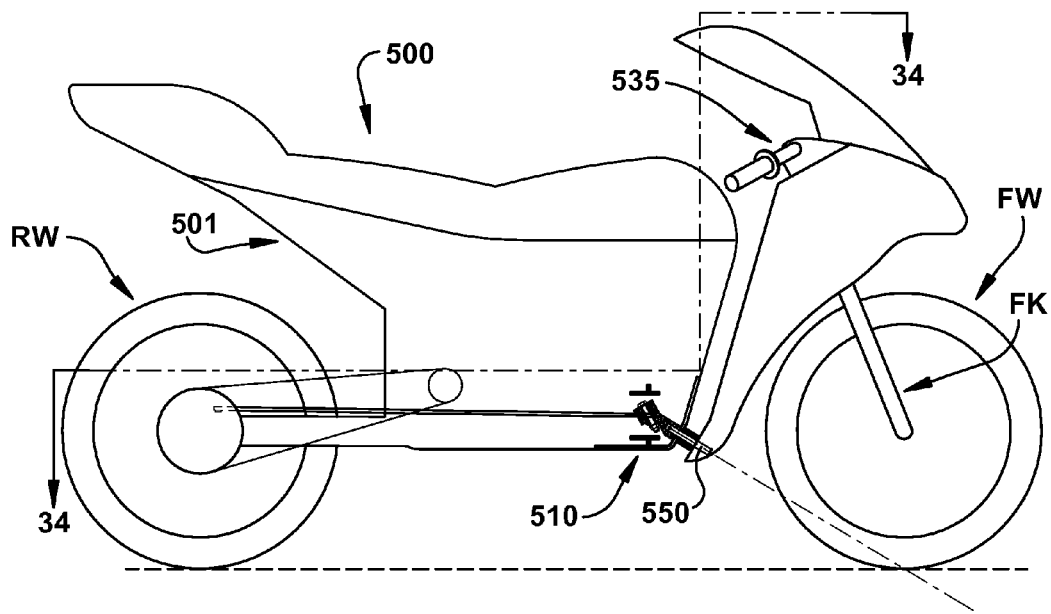
FIG. 33 is a side elevation schematic of an alternate embodiment of an articulated two-wheeled vehicle of the present disclosure.
Figure 34:
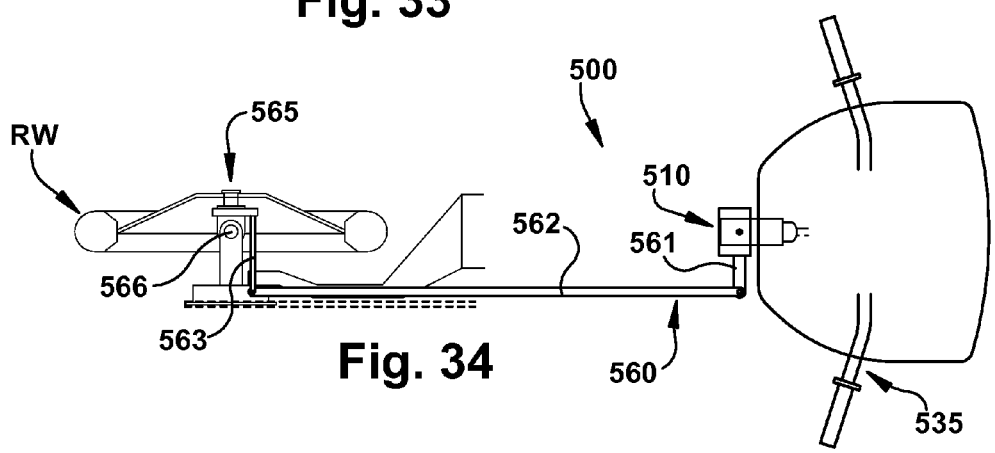
FIG. 34 is a top view schematic of the articulated two-wheeled vehicle of FIG. 33.
Figure 35:
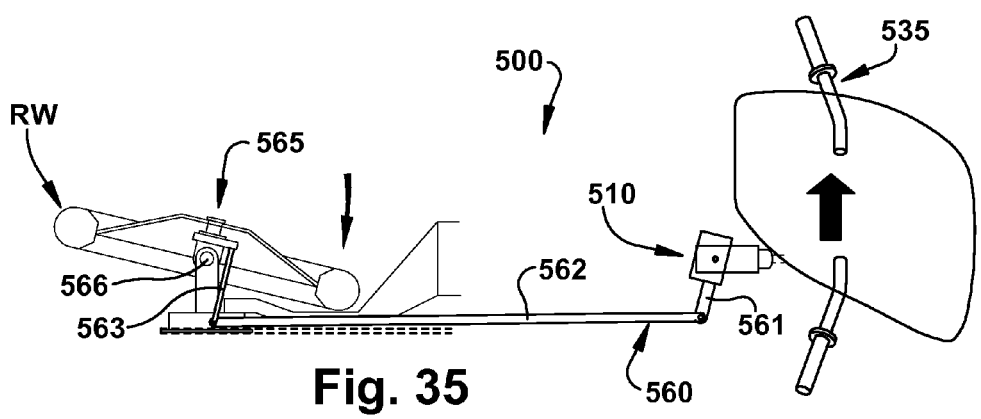
FIG. 35 is a top view schematic of the articulated two-wheeled vehicle of FIG. 33 in a turned configuration.

FIGS. 33-35 illustrate an alternate embodiment of an articulated two-wheeled vehicle of the present disclosure, which may be a motorized vehicle having a frame indicated schematically at 501 with attached front wheel FW and rear wheel RW, and a motor (not shown) for rotationally driving the rear wheel RW. An articulated frame joint 510 is located generally at the same height as the axes of the wheels FW, RW and can be forward of the center of the wheelbase. Similar to the previously described embodiments, a front frame tie rod 550 extends forward from the articulated frame joint 510 for connection to a front frame member and fork F. As previously described, the articulation of frame joint 510 and in particular the pivotal mounting of front frame tie rod 550 in the joint housing enable turning of the fork F. As illustrated in FIG. 35, a rear wheel steering linkage, indicated generally at 560, includes link arms 561, 562 and 563 from the frame joint 510 to a hub 565 of the rear wheel RW. Link arm 561 is connected to a common pivot with the front frame tie rod 550 within the frame joint 510 and through link arms 562 and 563 turns the rear wheel hub 565 about a vertical pivot mount 566 to turn the rear wheel RW in a direction opposite to a turn of the front wheel FW.

FIGS. 37-42 schematically illustrate various alternate embodiments and frame configurations of the articulated two-wheeled vehicles of the present disclosure, indicated generally at 100, having center of gravity CG locations as indicated, and operational roll angles and yaw angles as indicated. As indicated in each of these FIGS. 37-42, the position of the articulated frame joint 110 is dictated by the configuration of the connecting members of the frame F. The turn pivot axis TPA and roll pivot axis RPA for each embodiment are spatially related to the location of the articulated frame joint 110 of the vehicle 100, as indicated. The turn pivot axis TPA rotation defines the yaw angle of the rear frame sub-assembly aft of the articulated frame joint 110. The roll pivot axis RPA rotation defines the roll angle of the front frame sub-assembly forward of the articulated frame joint 110. The degree of turn pivot axis TPA rotation is determined by the degree of roll pivot axis RPA rotation.

The amount of relative rotation is dictated by the particularly geometry of the frame F and the degrees and ranges of motion of the components of the articulated frame joint 110. Also indicated in FIGS. 37-42 are exemplary angular orientations of connecting members of the vehicle frame F and the force vectors to the ground, i.e. through the wheels FW, RW. As illustrated, it is possible in accordance with the disclosure to direct and/or align the roll pivot axis RPA and/or turn pivot axis TPA with any particular member of members of the frame F and/or the diameters or tangential contact areas of the front or rear wheels FW, RW.

The disclosure and related inventions thus include articulated two-wheeled vehicles with front and rear frame sub-assemblies or sub-frames which are interconnected by an articulated frame joint which enables variable relative motion and displacement of the front and rear frame sub-assemblies for both straight path and turning motions. In accordance with the general principles and concepts of the disclosure and related inventions, the articulated frame joint is configured to allow the front frame sub-assembly to be angularly displaced relative to the rear frame sub-assembly through available degrees of roll angle as indicated and described, and to allow the front frame sub-assembly to be displaced laterally of the rear frame sub-assembly through available degrees of yaw angle as indicated and described. Accordingly any particular configuration of the front and rear frame sub-assemblies and the articulated frame joint which enable this interaction and relative displacements and motions are within the scope of this disclosure and the related inventions.

What is claimed is:

1. A two-wheeled vehicle comprising:
    an articulated frame assembly attachable to a frame of the two-wheeled vehicle, the frame including
        a front frame sub-assembly comprising a front wheel of the two-wheeled vehicle;
        a rear frame sub-assembly comprising a rear wheel of the two-wheeled vehicle;
        an articulated frame joint connecting the front and rear frame sub-assemblies, the articulated frame joint having a housing; and
        a swing bracket pivotally mounted to the housing,
    wherein the front frame sub-assembly is connected to the swing bracket,
    wherein the articulated frame assembly, when coupled to the frame, enables the rear wheel to turn in a first direction according to a turn pivot axis of the rear wheel defining a yaw angle of the rear wheel with respect to the frame of the two-wheeled vehicle, and
    wherein the first direction is opposite to a second direction associated with a roll of the front wheel according to a roll pivot axis defining a roll angle with respect to the frame.

2. The two-wheeled vehicle of claim 1, further comprising a front frame tie rod receiver extending from the swing bracket.

3. The two-wheeled vehicle of claim 2, further comprising:
    a tie rod connecting the articulated frame joint to the front frame sub-assembly.

4. The two-wheeled vehicle of claim 1, further comprising:
    a tie rod connecting the articulated frame joint to the front frame sub-assembly.

5. An apparatus, comprising:
an articulated frame assembly attachable to a frame of a vehicle comprising a front movement element and a rear movement element,
wherein the articulated frame assembly is adapted to be mechanically coupled to the frame,
wherein the articulated frame assembly, when coupled to the frame, enables the rear movement element to turn in a first direction according to a turn pivot axis of the rear movement element defining a yaw angle of the rear movement element with respect to the frame of the vehicle, and
wherein the first direction opposite to a second direction associated with a roll of the front movement element according to a roll pivot defining a roll angle with respect to the frame.

6. The apparatus of claim 5, wherein the vehicle is a two-wheeled vehicle, and wherein rear movement and the front movement element are a rear wheel and a front wheel, respectively, of two-wheeled vehicle.

7. The apparatus of claim 6, wherein the articulated frame assembly turns the rear wheel in the first direction opposite to the second direction associated with the roll of the front wheel to offset a movement associated with the roll of the front wheel according to the roll pivot axis defining the roll angle with respect to the frame.

8. The apparatus of claim 5, wherein the vehicle slides across a ground surface via a rear sliding element and a front sliding element that slide across the ground surface, and wherein the rear movement element and the front movement element are the rear sliding element and the front sliding element, respectively, of the vehicle.

9. The apparatus of claim 8, wherein the articulated frame assembly turns the rear sliding element in the first direction opposite to the second direction associated with the roll of the front sliding element to offset a movement associated with the roll of the front sliding element according to the roll pivot axis defining the roll angle with respect to the frame.

10. The apparatus of claim 5, wherein the articulated frame assembly comprises:
a swing bracket pivotally mounted to a housing of the articulated frame assembly, and wherein the swing bracket facilitates the rear movement element turning in the first direction opposite to the second direction associated with the roll of the front movement element according to the roll pivot axis defining the roll angle with respect to the frame.

11. The apparatus of claim 5, wherein the articulated frame assembly comprises:
an angled kingpin at least partly mechanically coupling the frame to the articulated frame assembly, and wherein an angle of the angled kingpin facilitates the rear movement element to turn in the first direction opposite to the second direction associated with the roll of the front movement element according to the roll pivot axis defining the roll angle with respect to the frame.

12. The apparatus of claim 11, wherein the turn pivot axis defines the yaw angle of the rear movement element with respect to the articulated frame assembly,
wherein the roll pivot axis defines the roll angle of the front movement element with respect to the articulated frame assembly, and
wherein an increase in the angle of the angled kingpin results in a corresponding increase in rotation of the turn pivot angle in relation to rotation of the roll pivot angle.

13. The apparatus of claim 5,
wherein the turn pivot axis defines the yaw angle of the rear movement element with respect to the articulated frame assembly,
wherein the roll pivot axis defines the roll angle of the front movement element with respect to the articulated frame assembly, and
wherein an amount of rotation of the roll angle of the roll pivot axis determines a proportional and resulting amount of rotation of the yaw angle of the turn pivot axis.

14. The apparatus of claim 5, wherein the articulated frame assembly comprises:
a rear steer hub that, in response to input relating to a first amount of the roll of the front movement element, sends an instruction to a rear wheel steering linkage that instructs the rear wheel steering linkage to turn the rear movement element in the first direction opposite to the second direction associated with the roll of the front movement element, and wherein a second amount of the turn of the rear movement element is a function of the first amount of the roll of the front movement element represented by the input.

15. A vehicle, comprising:
a frame;
at least two wheels comprising at least a front wheel and a rear wheel connected to the frame; and
an articulated frame assembly mechanically coupled to the frame enabling the rear wheel to turn in a first direction according to a turn pivot axis of the rear wheel defining a yaw angle of the rear wheel with respect to the frame of the vehicle, wherein the first direction is opposite to a second direction associated with a roll of the front wheel according to a roll pivot axis defining a roll angle with respect to the frame.

16. The vehicle of claim 15, wherein the articulated frame assembly further enables the rear wheel to turn out of alignment with the frame.

17. The vehicle of claim 15, wherein the articulated frame assembly comprises:
a front frame sub-assembly;
a rear frame sub-assembly; and
an articulated frame joint connecting the front and rear frame sub-assemblies.

18. The vehicle of claim 17, wherein the articulated frame joint comprises a housing, wherein the vehicle further comprises a swing bracket pivotally mounted to the housing, and wherein the front frame sub-assembly is connected to the swing bracket.

19. The vehicle of claim 15, wherein the articulated frame assembly further enables a first amount of turning done by the rear wheel in the first direction to be in proportion, and in response, to a second amount of rolling done by the front wheel.

* * * * *